(12) United States Patent (10) Patent No.: US 8,884,548 B2
Martin-Lopez et al. (45) Date of Patent: Nov. 11, 2014

(54) POWER FACTOR CORRECTION CONVERTER WITH CURRENT REGULATED OUTPUT

(71) Applicant: Asahi Kasei Microdevices Corporation, Tokyo (JP)

(72) Inventors: Fernando Ramon Martin-Lopez, Colorado Springs, CO (US); Gabriel C. Gavrila, Colorado Springs, CO (US); Takahiro Umeki, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 114 days.

(21) Appl. No.: 13/781,233

(22) Filed: Feb. 28, 2013

(65) Prior Publication Data

US 2014/0239810 A1 Aug. 28, 2014

(51) Int. Cl.
*H05B 37/02* (2006.01)
(52) U.S. Cl.
CPC ..................................... *H05B 37/02* (2013.01)
USPC .......................................... 315/291; 315/308
(58) Field of Classification Search
USPC ............ 315/209 R, 224–226, 291, 307, 308, 315/312, 320; 363/84, 87, 89, 97, 98
See application file for complete search history.

(56) References Cited

U.S. PATENT DOCUMENTS

| 7,157,809 | B2 | 1/2007 | Gavrila et al. |
| 7,944,153 | B2 * | 5/2011 | Greenfeld ..................... 315/291 |
| 2005/0007085 | A1 | 1/2005 | Murakami |
| 2007/0152604 | A1 | 7/2007 | Tatsumi |
| 2007/0262796 | A1 | 11/2007 | Murakami |
| 2009/0201002 | A1 | 8/2009 | Murakami |
| 2010/0220049 | A1 | 9/2010 | Murakami |
| 2011/0156643 | A1 | 6/2011 | Chen et al. |
| 2011/0181582 | A1 | 7/2011 | Murakami |

FOREIGN PATENT DOCUMENTS

| EP | 2315497 A1 | 4/2011 |
| JP | H10-127046 A | 5/1998 |
| JP | 2004-135372 A | 4/2004 |
| JP | 2005-005112 A | 1/2005 |

(Continued)

OTHER PUBLICATIONS

International Search Report and Written Opinion by the International Search Authority dated May 27, 2014, issued in International Patent Application No. PCT/JP2014/000834.

(Continued)

*Primary Examiner* — Jimmy Vu
(74) *Attorney, Agent, or Firm* — Morgan, Lewis & Bockius LLP

(57) ABSTRACT

A power factor correction converter in a buck-boost configuration may include a set-up circuit configured to supply an input voltage, a buck transistor connected to the set-up circuit, and configured to receive a current from the diode bridge, a first diode connected to the buck transistor, a boost transistor, a resistor connected to the boost transistor, a coil that connects the buck transistor and the boost transistor, a buck-boost PFC regulator connected to the set-up circuit, and configured to regulate a time pattern of the on/off status of the first transistor and the second transistor synchronously, a second diode connected to the coil and the boost transistor, and configured to output a first level voltage, a capacitor connected to the second diode and a load connected to the second diode.

57 Claims, 18 Drawing Sheets

(56) References Cited

FOREIGN PATENT DOCUMENTS

| | | | |
|---|---|---|---|
| JP | 2005-033853 | A | 2/2005 |
| JP | 2007-080771 | A | 3/2007 |
| JP | 2011-049197 | A | 3/2011 |
| JP | 2011-160649 | A | 8/2011 |
| JP | 2011-166903 | A | 8/2011 |

OTHER PUBLICATIONS

Texas Instruments, LED Drive with Dynamic Headroom Control and Thermal Control Interfaces, LM3464, LM3464A, Apr. 2010-Revised Jun. 2011, 30 pages, www.ti.com.

* cited by examiner

POWER FACTOR CORRECTION CONVERTER WITH CURRENT REGULATED OUTPUT

FIELD OF INVENTION

The present invention relates generally to a light emitting diode (LED) lighting system in the industrial/home lighting field, and in particular, relates to a power factor correction (PFC) converter with current regulated output implemented in an LED lighting system in the industrial/home lighting field.

BACKGROUND OF INVENTION

The LED device has matured greatly since the time of its inception over thirty years ago. The semiconductor technology enables an LED lighting device with orders of magnitude longer life than the traditional incandescent and fluorescent bulbs. To save energy and stop global warming, world-wide governments propose migrating away from the traditional incandescent and fluorescent bulbs. However, the cost of manufacturing LED lighting devices is still much higher than the traditional incandescent and fluorescent bulbs and therefore, becomes an obstacle to the migration. While the manufacturing cost of the LED lighting devices remains high, improving the performance of an LED driver; for example, achieving a high power factor correction value may be an alternative solution to reducing the cost and facilitating the migration from traditional lighting devices to LED lighting devices.

Early stage industry standard for industrial/home LED lighting drivers simply allows the LED current to be the same as the alternating current (AC) input current. FIG. 1 is an exemplary illustration 100 of an LED lighting driver with a same AC current flowing across an LED string and a coil in the prior art. In exemplary illustration 100, an AC current from a set-up circuit 101 may flow across an LED string 106 and a coil 108. Therefore, the current flowing through the LED string 106 is the same as the current flowing through the coil 108 and the AC current from the set-up circuit 101. However, in this prior art configuration, the AC current does not necessarily follow the AC voltage so as to achieve a high Power Factor level>0.9. When AC current varies in accordance with the AC line input to the set-up circuit 101, then such criteria serves to meet the PFC standard (PFC>0.9) for industrial/home lighting that most countries in the world adopted since the European Union instituted the IEC555 standard in early 1990s.

In the early stage technology of the LED lighting driver, although the average of the LED current may be constant, the instant LED current varies in a triangular shape, and behaves as a switching-type current flow in accordance with the AC input current. FIG. 2 is an exemplary illustration 200 of an LED current that varies over a wide range with peak and valley levels in the prior art. In exemplary illustration 200, although the average of the LED current may be constant, the instant LED current varies in accordance with the coil current peak and valley values and the LED current may also vary in a triangular shape, i.e., a switching-type current flow. Such architecture does not lead to high PFC because the AC current does not follow the sinusoidal AC voltage line.

The performance of the LED lighting driver improved in the past few years by adopting a true PFC stage prior to the LED current driver. FIG. 3 is an exemplary illustration 300 of another LED lighting driver with separated AC current and LED current in the prior art. The exemplary illustration 300 may comprise a set-up circuit 301, a boost PFC regulator 305, a first coil 308, a first transistor 310, a first diode 309, a first capacitor 307, an LED string 321, a second capacitor 320, a second coil 322, a second diode 323, a second transistor 324 and an LED control 325. The boost PFC regulator 305 may be implemented to regulate a direct current (DC) level voltage at the anode of the LED string 321. In some embodiment, the DC level voltage may refer to a VPFC level voltage of approximate 400v. The VPFC level voltage may provide higher tolerance to current variation than the AC line input, and thus, current flowing through the LED string 321 may no longer be sensitive to the AC line input and the performance of the LED string may be increased. This approach increased the performance of the LED Lighting as a fixed level voltage (VPFC) inputted into the LED string is no longer sensitive to a varying AC input. Meanwhile, the industry increased the PFC standard to be higher than 0.9 and closer to 0.98.

Recent research shows that the current flowing through LEDs may be forced to true constant rather than varying around a fixed average value. Further, dimming capability when the LED current becomes constant improves the LED performance by at least one order of magnitude. One example of the above approach is described in European Publication EP 2315497A1. However, in EP 2315497A1, the LED string cannot be connected directly to the VPFC level voltage. Further, U.S. Pat. No. 7,157,809 B2 underlines the problems to regulate current in non-linear loads and provides a general solution. U.S. Pat. No. 7,157,809 B2 provides a regulated load/LED current as long as the current source is maintained with sufficient headroom from the current source drain to the current source terminal. Satisfying the headroom requirement guarantees the load/LED current is constant and independent from the variation of the output voltage. LED lighting devices may benefit from the above noted approach because the PFC stage implemented prior to the load provides a constant level voltage to the LED string and enables the VPFC to be independent from the AC input. FIG. 4 is an exemplary illustration 400 of a boost converter with higher output voltage than input voltage in the prior art. The exemplary illustration 400 of a boost converter may comprise a set-up circuit 401, a boost PFC regulator 405, a coil 408, a transistor 410, a diode 409 and a capacitor 407. The boost converter allows the output voltage to be always higher than the input voltage. Under the circumstances of the universal range discussed above, the output voltage of the boost converter may be higher than 276 AC, which has been standardized to as high as 400v DC. The boost converter in exemplary illustration 400 has particular advantages in the LED lighting market because the AC current is always continuous and makes it easier to follow the AC line voltage. However, a disadvantage of the exemplary illustration 400 is that there is no intrinsic current limit and therefore additional circuitry may be required to limit the inrush current during startup.

The industry has accustomed to so-called universal line, where some countries operate at 85 AC while others operate at 276 AC. This is fundamentally 100 AC−15%. and 240 AC+15%. Such a wide range of AC levels must be met via a universal line power supply, and an LED lighting device has to be designed to fit the requirement of the wide range. Under the circumstances of the universal range discussed above, the output voltage of the boost converter may be higher than 276 AC, which is standardized to as high as 400v direct current (DC). As illustrated in FIG. 5, the 400v DC level, i.e., VPFC level is applied to the LED string. However, such applications require a large number of LEDs of approximately 130 LED diodes, as each LED diode has approximately 3v drop at a room temperature.

SUMMARY OF THE INVENTION

Accordingly, the present invention is directed to a power factor correction (PFC) converter with current regulated output in an LED lighting system substantially obviates one or more problems due to limitations and disadvantages of the related art.

In an embodiment, the present invention provides a power factor correction (PFC) converter in a boost configuration followed by a buck regulator. The PFC converter in a boost configuration comprises a set-up circuit configured to supply an input voltage, the set-up circuit further comprises an alternating current (AC) source; an electromagnetic interference (EMI) filter; and a diode bridge; a first coil connected to the set-up circuit, and configured to receive a rectified current from the diode bridge; a first transistor connected to the first coil; a boost PFC regulator configured to regulate a first time pattern of an on/off status of the first transistor so as to force the AC current to follow the AC voltage envelope and achieve a high PFC>0.9; a first diode connected to the first transistor, and configured to output a first level voltage; a first capacitor connected to the first diode; a buck converter configured to receive the first level voltage from the first diode, and convert the first level voltage to a second level voltage, the buck converter further comprises a second transistor connected to the first diode; a buck regulator connected to the second transistor; a second diode connected to the second transistor; a second coil connected to the second transistor, and configured to output the second level voltage; a second capacitor connected to the second coil; and a load connected to the second coil.

In some embodiments, the load further comprises a light-emitting diode (LED) string comprising a plurality of diodes connected in series; and a constant current source configured to maintain a constant load current or an arbitrarily modulated load current flowing through the LED string. When the LED string is applied as load, this includes linear, logarithmic and pulse width modulation (PWM) dimming. The number of LEDs in the LED string determines the voltage at the output of the buck converter.

In some embodiments, the LED string is configured to be a low-side connection when the anode of the LED string is connected to the second coil, the cathode of the LED string is connected to one end of the constant current source, and the other end of the constant current source is connected to the ground, and the buck regulator further comprises a second reference voltage corresponding to an intended voltage drop across the current source; a second EA configured to compare the second reference voltage with a third level voltage received at the cathode of the LED string in order to keep the constant current source headroom high enough for proper operation of the current source; a second oscillator; and a second PWM comparator configured to receive outputs of the second EA and the second oscillator, and regulate a second time pattern of the on/off status of the second transistor.

In some embodiments, the LED string is configured to be a high-side connection when one end of the constant current source is connected to the second coil, the other end of the constant current source is connected to the anode of the LED string, and the cathode of the LED string is connected to the ground, and the buck regulator further comprises a second reference voltage corresponding to an intended voltage drop across the current source; a second EA configured to compare the second reference voltage with a third level voltage transmitted by a differential amplifier (DIF); a second oscillator; and a second PWM comparator configured to receive outputs of the second EA and the second oscillator, and regulate a second time pattern of the on/off status of the second transistor.

In some embodiments, if the third level voltage is less than the second reference voltage, the second EA amplifies its output, and the second PWM comparator extends a second duty cycle to boost the second level voltage; or if the third level voltage is greater than the second reference voltage, the second PWM comparator shortens the second duty cycle to reduce the second level voltage.

In some embodiments, when the first transistor is on, the first coil is configured to accumulate received current, or when the first transistor is off, the first coil is configured to transmit accumulated current and output the first level voltage to the buck converter via the first diode.

In some embodiments, the boost PFC regulator is configured to achieve a high power factor correction level by regulating the first time pattern of the on/off status of the first transistor, in such a way that the AC current follows the AC voltage envelope.

In some embodiments, the second level voltage is regulated in a feedback loop comprising the buck converter, the LED string and the constant current source.

In some embodiments, the second level voltage is independent of the first level voltage. The second level voltage is determined by the number of LEDs in the string plus the constant current source headroom.

In some embodiments, the constant load current or the arbitrarily modulated load current flowing through the LED string is independent of the current flowing through the set-up circuit, the first level voltage and the second level voltage. This is an important element that the present invention brings into the state of the art in order to allow better load current regulation while still achieving a high PFC.

In some embodiments, the boost PFC regulator further comprises a first pair of resistor dividers connected to the output of the set-up circuit; a second pair of resistor dividers configured to receive the first level voltage at the output of a first diode; a first reference voltage corresponding to the first level voltage at the output of a first diode; a first error amplifier (EA) configured to compare the first reference voltage with the first level voltage received at the second pair of resistor dividers; a multiplier configured to receive outputs of the first pair of resistor dividers and the first EA; a first oscillator; and a first pulse width modulation (PWM) comparator configured to receive outputs of the multiplier and the first oscillator, and regulate the first time pattern of the on/off status of the first transistor.

In some embodiments, if the first level voltage received at the second pair of resistor dividers is less than the first reference voltage, the first EA amplifies its output via the multiplier, and the first PWM comparator extends a first duty cycle to boost the first level voltage; or if the first level voltage received at the second pair of resistor dividers is greater than the first reference voltage, the first PWM comparator shortens the first duty cycle to reduce the first level voltage. This first level voltage is about 400v to allow the coverage of Universal AC line input levels.

In yet another embodiment, the load further comprises a light-emitting diode (LED) string comprising a plurality of diodes connected in series; a current sense resistor; and an optional disconnect switch with one end connected to one end of the sense resistor.

In some embodiments, the LED string is configured to be a low-side connection when the anode of the LED string is connected to the second coil, the cathode of the LED string is connected to the other end of the current sense resistor, and the other end of the optional disconnect switch is connected to the ground, (please note that the configuration optional switch followed by current sense resistor to ground will achieve the same function) and the buck regulator further comprises a second reference voltage corresponding to an intended voltage drop across the load; a second EA configured to compare the second reference voltage with a third level voltage received at the cathode of the LED string; this third level voltage equals to the intended LED current times the current sense resistor; a second oscillator; and a second PWM comparator configured to receive outputs of the second EA and the second oscillator, and regulate a second time pattern of the on/off status of the second transistor.

In some embodiments, the LED string is configured to be a high-side connection when the other end of the current sense resistor is connected to the second coil, the other end of the optional disconnect switch is connected to the anode of the LED string, and the cathode of the LED string is connected to the ground, and the buck regulator further comprises a second reference voltage corresponding to an intended voltage drop across the current sense resistor; a second EA configured to compare the second reference voltage with a third level voltage transmitted by a differential amplifier (DIF); a second oscillator; and a second PWM comparator configured to receive outputs of the second EA and the second oscillator, and regulate a second time pattern of the on/off status of the second transistor.

In some embodiments, if the third level voltage is less than the second reference voltage, the second EA amplifies its output, and the second PWM comparator extends a second duty cycle to boost the second level voltage; or if the third level voltage is greater than the second reference voltage, the second PWM comparator shortens the second duty cycle to reduce the second level voltage. In this way, the voltage across the load is adjusted so that the LED current can be regulated.

In yet another embodiment, a power factor correction (PFC) converter in a boost configuration followed by a buck regulator comprises a set-up circuit configured to supply an input voltage, the set-up circuit comprises an alternating current (AC) source; an electromagnetic interference (EMI) filter; and a diode bridge; a first coil connected to the set-up circuit, and configured to receive a current from the diode bridge; a first transistor connected to the first coil; a boost PFC regulator configured to regulate a first time pattern of the on/off status of the first transistor; a first synchronous rectifier connected to the first transistor via a first inverter and configured to output a first level voltage; a first capacitor connected to the first synchronous rectifier; a buck converter configured to receive the first level voltage from the first synchronous rectifier, and convert the first level voltage to a second level voltage, the buck converter further comprises a second transistor connected to the first diode; a buck regulator connected to the second transistor; a second synchronous rectifier connected to the second transistor via a second inverter; a second coil connected to the second transistor, and configured to output the second level voltage; and a second capacitor connected to the second coil; and a load connected to the second coil.

In some embodiments, the load further comprises a light-emitting diode (LED) string comprising a plurality of diodes connected in series; and a constant current source configured to maintain a constant load current or an arbitrarily modulated load current flowing through the LED string. When the LED string is applied as load, this includes linear, logarithmic and pulse width modulation (PWM) dimming.

In some embodiments, the LED string is configured to be a low-side connection when the anode of the LED string is connected to the second coil, the cathode of the LED string is connected to one end of the constant current source, and the other end of the constant current source is connected to the ground, and the buck regulator further comprises a second reference voltage corresponding to an intended voltage drop across the constant current source; a second EA configured to compare the second reference voltage with a third level voltage received at the cathode of the LED string; a second oscillator; and a second PWM comparator configured to receive outputs of the second EA and the second oscillator, and regulate a second time pattern of the on/off status of the second transistor.

In some embodiments, the LED string is configured to be a high-side connection when one end of the constant current source is connected to the second coil, the other end of the constant current source is connected to the anode of the LED string, and the cathode of the LED string is connected to the ground, and the buck regulator further comprises a second reference voltage corresponding to an intended voltage drop across the constant current source; a second EA configured to compare the second reference voltage with a third level voltage; a second oscillator transmitted by a differential amplifier (DIF); and a second PWM comparator configured to receive outputs of the second EA and the second oscillator, and regulate a second time pattern of the on/off status of the second transistor.

In some embodiments, if the third level voltage is less than the second reference voltage, the second EA amplifies its output, and the second PWM comparator extends a second duty cycle to boost the second level voltage; or if the third level voltage is greater than the second reference voltage, the second PWM comparator shortens the second duty cycle to reduce the second level voltage.

In some embodiments, the boost PFC regulator further comprises a first pair of resistor dividers connected to the output of the set-up circuit; a second pair of resistor dividers configured to receive the first level voltage at the output of the first synchronous rectifier; a first reference voltage corresponding to the first level voltage at the output of the first synchronous rectifier; a first error amplifier (EA) configured to compare the first reference voltage with the first level voltage received at the second pair of resistor dividers; a multiplier configured to receive outputs of the first pair of resistor dividers and the first EA; a first oscillator; and a first pulse width modulation (PWM) comparator configured to receive outputs of the multiplier and the first oscillator, and regulate the first time pattern of the on/off status of the first transistor in order to force the AC current to follow the AC voltage so as to achieve high PFC level.

In some embodiments, if the first level voltage is less than the first reference voltage, the first EA amplifies its output via the multiplier, and the first PWM comparator extends a first duty cycle to boost the first level voltage; or if the first level voltage is greater than the first reference voltage, the first PWM comparator shortens the first duty cycle to reduce the first level voltage.

In yet another embodiment, the power factor correction (PFC) converter in a boost configuration followed by a buck regulator further comprises a plurality of loads connected to the second coil, where the plurality of loads are connected in parallel, and each of the plurality of loads further comprises a light-emitting diode (LED) string comprising a plurality of diodes connected in series; and a constant current source configured to maintain a constant load current or an arbitrarily modulated load current flowing through the LED string. When the LED string is applied as load, this includes linear, logarithmic and pulse width modulation (PWM) dimming.

In some embodiments, the LED string is configured to be a low-side connection when the anode of the LED string is connected to the second coil, the cathode of the LED string is connected to one end of the constant current source, and the other end of the constant current source is connected to the ground, and the buck regulator further comprises a second reference voltage corresponding to a lowest intended voltage drop across the plurality of loads; a second EA configured to compare the second reference voltage with a third level voltage from the cathode that has the lowest voltage drop among the plurality of the LED strings; a second oscillator; and a second PWM comparator configured to receive outputs of the second EA and the second oscillator, and regulate a second time pattern of the on/off status of the second transistor.

In some embodiments, the LED string is configured to be a high-side connection when one end of the constant current source is connected to the second coil, the other end of the constant current source is connected to the anode of the LED string, and the cathode of the LED string is connected to the ground, and the buck regulator further comprises a second reference voltage corresponding to a lowest intended voltage drop across the plurality of loads; a second EA configured to compare the second reference voltage with a third level voltage transmitted by a differential amplifier (DIF); a second oscillator; and a second PWM comparator configured to receive outputs of the second EA and the second oscillator, and regulate a second time pattern of the on/off status of the second transistor.

In some embodiments, the power factor correction (PFC) converter in a boost configuration followed by a buck regulator further comprises a minimum select unit configured to select a minimum value from a plurality of voltages received at the cathodes of the plurality of the LED strings, and transmit the minimum value to the second EA as the third level voltage.

In yet another embodiment, the power factor correction (PFC) converter in a boost configuration followed by a buck regulator further comprises a minimum select unit configured to select a minimum value from a plurality of voltages received at the anodes of the plurality of the LED strings, and transmit the minimum value to the second EA via the DIF as the third level voltage.

In some embodiments, if the third level voltage is less than the second reference voltage, the second EA amplifies its output, and the second PWM comparator extends a second duty cycle to boost the second level voltage; or if the third level voltage is greater than the second reference voltage, the second PWM comparator shortens the second duty cycle to reduce the second level voltage.

The Boost configuration followed by the Buck driver described above suffers from complexity and the need for 2 inductors. A large cost is incurred in the magnetic side of power supplies because of the large volume for the coil and its core. Reducing the number of coils or even designing away the transformer down to a single inductor, brings important commercial advantages (reduced cost, size and assembly).

The Buck Boost architecture proposed in this invention achieves at least the Boost Buck performance with a simpler configuration because it takes advantage of the Buck Boost topology which allows the 2 converters to merge into a single circuit and operate around a single coil. Further, advantage of this architecture is that the regulated voltage is independent of the AC line level being above or below it and furthermore, the regulated voltage is determined by the load.

In a further embodiment, a power factor correction (PFC) converter in a buck-boost configuration comprises a set-up circuit configured to supply an input voltage, the set-up circuit comprises an alternating current (AC) source; an electromagnetic interference (EMI) filter that; and a diode bridge; a buck transistor connected to the set-up circuit, and configured to receive a current from the diode bridge; a first diode connected to the buck transistor; a boost transistor; a resistor connected to the boost transistor; a coil that connects the buck transistor and the boost transistor; a buck-boost PFC regulator connected to the set-up circuit, and configured to regulate a time pattern of the on/off status of the buck transistor and the boost transistor synchronously; a second diode connected to the coil and the boost transistor, and configured to output a first level voltage; a capacitor connected to the second diode; and a load connected to the second diode.

In some embodiments, the load further comprises a light-emitting diode (LED) string comprising a plurality of diodes connected in series; and a constant current source configured to maintain a constant load current or an arbitrarily modulated load current flowing through the LED string. When the LED string is applied as load, this includes linear, logarithmic and pulse width modulation (PWM) dimming.

In some embodiments, the LED string is configured to be a low-side connection when the anode of the LED string is connected to the second diode, the cathode of the LED string is connected to one end of the constant current source, and the other end of the constant current source is connected to the ground, and the buck-boost PFC regulator further comprises a pair of resistor dividers connected to the output of the set-up circuit; a reference voltage corresponding to an intended voltage across the constant current source; the purpose is to maintain enough headroom across the constant current source to ensure its proper operation; an error amplifier (EA) configured to compare the reference voltage with a second level voltage received at the cathode of the LED string; a multiplier configured to receive outputs of the pair of resistor dividers and the EA; an oscillator and current sense ramp generator configured to receive the output of the boost transistor; a pulse width modulation (PWM) comparator configured to receive outputs of the multiplier and the oscillator and current sense ramp generator, and a driver that connects the output of the PWM comparator with the buck transistor and the boost transistor to synchronously regulate the time pattern of the on/off status of the buck transistor and the boost transistor.

In some embodiments, the LED string is configured to be a high-side connection when one end of the constant current source is connected to the second diode, the other end of the constant current source is connected to the anode of the LED string, and the cathode of the LED string is connected to the ground, and the buck-boost PFC regulator further comprises a pair of resistor dividers connected to the output of the set-up circuit; a reference voltage corresponding to an intended voltage across the constant current source; an error amplifier (EA) configured to compare the reference voltage with a second level voltage transmitted by a differential amplifier (DIF); a multiplier configured to receive outputs of the pair of resistor dividers and the EA; an oscillator and current sense ramp generator configured to receive the output of the boost transistor; a pulse width modulation (PWM) comparator configured to receive outputs of the multiplier and the oscillator and current sense ramp generator, and a driver that connects the output of the PWM comparator with the buck transistor and the boost transistor to synchronously regulate the time pattern of the on/off status of the buck transistor and the boost transistor.

In some embodiments, if the second level voltage is less than the reference voltage, the EA amplifies its output via the multiplier, and the PWM comparator extends the duty cycle to boost the first level voltage; or if the second level voltage is greater than the reference voltage, the PWM comparator shortens the duty cycle to reduce the first level voltage. This adjusts the voltage across the load in such a way as to maintain enough headroom across the constant current source in order to ensure its proper operation. This ensures that the current flowing through the LED string is well regulated. This adjustment is independent from and does not impact the operation of the PFC section of the circuit.

In some embodiments, when the buck transistor and the boost transistor are on synchronously, the coil is configured to accumulate received current; and when the buck transistor and the boost transistor are off synchronously, the coil is configured to transmit accumulated current and output the first level voltage via the second diode so as to allow the AC current to follow the AC voltage envelope and thus keep high PFC.

In some embodiments, the buck-boost PFC regulator is configured to achieve a high power factor correction level by regulating the time pattern of the on/off status of the buck transistor and the boost transistor synchronously.

In some embodiments, the first level voltage is regulated in a feedback loop comprising the second diode, the capacitor, the LED string and the constant current source.

In some embodiments, the constant load current or the arbitrarily modulated load current flowing through the LED string is independent from the current flowing through the set-up circuit and the first level voltage. In some embodiments, the number of LEDs in the string and the headroom across the constant current source determine the first voltage level, which is independent of the AC voltage input.

In a further embodiment, a power factor correction (PFC) converter in a buck-boost configuration comprises a set-up circuit configured to supply an input voltage, the set-up circuit comprises an alternating current (AC) source; an electromagnetic interference (EMI) filter; and a diode bridge; a buck transistor connected to the set-up circuit, and configured to receive an current from the diode bridge; a boost transistor; a resistor connected to the boost transistor; a coil that connects the buck transistor and the boost transistor in series; a first synchronous rectifier connected to the buck transistor; a second synchronous rectifier connected to the boost transistor; a buck-boost PFC regulator connected to the set-up circuit, and configured to regulate a first time pattern of an on/off status of the buck transistor and the boost transistor and a second time pattern of an on/off status of the first synchronous rectifier and the second synchronous rectifier in a synchronous manner; a capacitor connected to the second synchronous rectifier; and a load connected to the second synchronous rectifier.

In some embodiments, the LED string and the constant current source are configured to be a low-side connection when the anode of the LED string is connected to the second synchronous rectifier, the cathode of the LED string is connected to one end of the constant current source, and the other end of the constant current source is connected to the ground, and the buck-boost PFC regulator further comprises a pair of resistor dividers connected to the output of the set-up circuit; a reference voltage corresponding to an intended voltage drop across the constant current source; an error amplifier (EA) configured to compare the reference voltage with a second level voltage received at the cathode of the LED string; a multiplier configured to receive outputs of the pair of resistor dividers and the EA; an oscillator and current sense ramp generator configured to receive the output of the boost transistor; and a pulse width modulation (PWM) comparator configured to receive outputs of the multiplier and the oscillator and current sense ramp generator, and a driver that connects the output of PWM comparator with the buck transistor, the boost transistor, the first synchronous rectifier, and the second synchronous rectifier to regulate synchronously the first time pattern of the on/off status of the buck transistor and the boost transistor, and the second time pattern of the on/off status of the first synchronous rectifier and the second synchronous rectifier.

In some embodiments, the LED string and the constant current source are configured to be a high-side connection when one end of the constant current source is connected to the second synchronous rectifier, the other end of the constant current source is connected to the anode of the LED string, and the cathode of the LED string is connected to the ground, and the buck-boost PFC regulator further comprises a pair of resistor dividers connected to the output of the set-up circuit; a reference voltage corresponding to an intended voltage drop across the constant current source; an error amplifier (EA) configured to compare the reference voltage with a second level voltage transmitted by a differential amplifier (DIF); a multiplier configured to receive outputs of the pair of resistor dividers and the EA; an oscillator and current sense ramp generator configured to receive the output of the boost transistor; and a pulse width modulation (PWM) comparator configured to receive outputs of the multiplier and the oscillator and current sense ramp generator, and a driver that connects the output of PWM comparator with the buck transistor, the boost transistor, the first synchronous rectifier, and the second synchronous rectifier to regulate synchronously the first time pattern of the on/off status of the buck transistor and the boost transistor, and the second time pattern of the on/off status of the first synchronous rectifier and the second synchronous rectifier.

In some embodiments, if the second level voltage is less than the reference voltage, the EA amplifies its output via the multiplier, and the PWM comparator extends the duty cycle to boost the first level voltage; or if the second level voltage is greater than the reference voltage, the PWM comparator shortens the duty cycle to reduce the first level voltage. This adjusts the voltage across the load in such a way as to maintain enough headroom across the constant current source to ensure its proper operation. This ensures that the current flowing through the LED string is well regulated. This adjustment is independent from and does not impact the operation of the PFC section of the circuit.

In some embodiments, when the buck transistor and the boost transistor are synchronously on, the first synchronous rectifier and the second synchronous rectifier are synchronously off, and the coil is configured to accumulate current, and when the buck transistor and the boost transistor are synchronously turned off, the first synchronous rectifier and the second synchronous rectifier are synchronously turned on, and the coil is configured to transmit the accumulated current and output the first level voltage via the second synchronous rectifier.

In some embodiments, the buck-boost PFC regulator is configured to achieve a high power factor correction level by regulating synchronously the first time pattern of the on/off status of the buck transistor and the boost transistor, and the second time pattern of the on/off status of the first synchronous rectifier and the second synchronous rectifier.

In some embodiments, the first level voltage is regulated in a feedback loop comprising the second synchronous rectifier, the capacitor, the LED string and the constant current source.

The first level voltage is determined by the number of LEDs in the string plus the head room across the constant current source.

In some embodiments, the constant load current or the arbitrarily modulated load current flowing through the LED string is configured to be independent from the current flowing through the set-up circuit and the first level voltage.

In yet another embodiment, the power factor correction (PFC) converter in a buck-boost configuration further comprises a plurality of loads connected to the second diode, where the plurality of loads are connected in parallel, and each of the plurality of loads further comprises a light-emitting diode (LED) string comprising a plurality of diodes connected in series; and a constant current source configured to maintain a constant load current or an arbitrarily modulated load current flowing through the LED string. When the LED string is applied as load, this includes linear, logarithmic and pulse width modulation (PWM) dimming.

In some embodiments, when the buck transistor and the boost transistor are synchronously on, the coil is configured to accumulate received current; and when the buck transistor and the boost transistor are synchronously off, the coil is configured to transmit the accumulated current and output the first level voltage via the second diode.

In some embodiments, the plurality of constant load currents or the arbitrarily modulated load currents flowing through the plurality of LED strings are configured to be independent from the current flowing through the set-up circuit and the first level voltage, and the plurality of constant load currents or the arbitrarily modulated load currents flowing through the plurality of LED strings are independent from each other.

In some embodiments, the LED string is configured to be a low-side connection when the anode of the LED string is connected to the second diode, the cathode of the LED string is connected to one end of the constant current source, and the other end of the constant current source is connected to the ground, and the buck-boost PFC regulator further comprises a pair of resistor dividers connected to the output of the set-up circuit; a reference voltage corresponding to a lowest intended voltage drop across the plurality of constant current sources; an error amplifier (EA) configured to compare the reference voltage with a second level voltage received at the cathode of one of the plurality of the LED strings; a multiplier configured to receive outputs of the pair of resistor dividers and the EA; an oscillator and current sense ramp generator configured to receive the output of the boost transistor; a pulse width modulation (PWM) comparator configured to receive outputs of the multiplier and the oscillator and current sense ramp generator, and a driver that connects the output of PWM comparator with the buck transistor and the boost transistor to synchronously regulate the time pattern of the on/off status of the buck transistor and the boost transistor.

In some embodiments, the LED string is configured to be a high-side connection when one end of the constant current source is connected to the second diode, the other end of the constant current source is connected to the anode of the LED string, and the cathode of the LED string is connected to the ground, and the buck-boost PFC regulator further comprises a pair of resistor dividers connected to the output of the set-up circuit; a reference voltage corresponding to a lowest intended voltage drop across the plurality of constant current sources; an error amplifier (EA) configured to compare the reference voltage with a second level voltage transmitted by a differential amplifier (DIF); a multiplier configured to receive outputs of the pair of resistor dividers and the EA; an oscillator and current sense ramp generator configured to receive the output of the boost transistor; a pulse width modulation (PWM) comparator configured to receive outputs of the multiplier and the oscillator and current sense ramp generator, and a driver that connects the output of PWM comparator with the buck transistor and the boost transistor to synchronously regulate the time pattern of the on/off status of the buck transistor and the boost transistor.

In some embodiments, if the second level voltage is less than the reference voltage, the EA amplifies its output via the multiplier, and the PWM comparator extends the duty cycle to boost the first level voltage; or if the second level voltage is greater than the reference voltage, the PWM comparator shortens the duty cycle to reduce the first level voltage. This allows the system to keep the lowest voltage constant current source in proper operation and all other current sources will also have the minimum headroom covered.

In some embodiments, the power factor correction converter in a buck-boost configuration further comprises a minimum select unit configured to select a minimum value from a plurality of voltages received at the cathodes of the plurality of the LED strings, and transmit the minimum value to the buck-boost PFC regulator as a second level voltage.

In yet another embodiment, the power factor correction converter in a buck-boost configuration further comprises a minimum select unit configured to select a minimum value from a plurality of voltages received at the anodes of the plurality of the LED strings, and transmit the minimum value to the buck-boost PFC regulator via the DIF as a second level voltage.

In yet another embodiment, the load further comprises a light-emitting diode (LED) string comprising a plurality of diodes connected in series; a current sense resistor; and an optional disconnect switch with one end connected to one end of the current sense resistor. Note the configuration optional switch followed by current sense resistor to ground will achieve the same function.

In some embodiments, the LED string is configured to be a low-side connection when the anode of the LED string is connected to the second diode, the cathode of the LED string is connected to the other end of the current sense resistor, and the other end of the optional disconnect switch is connected to the ground, and the buck-boost PFC regulator further comprises a pair of resistor dividers connected to the output of the set-up circuit; a reference voltage corresponding to an intended voltage across the current sense resistor; an error amplifier (EA) configured to compare the reference voltage with a second level voltage received at the cathode of the LED string; a multiplier configured to receive outputs of the pair of resistor dividers and the EA; an oscillator and current sense ramp generator configured to receive the output of the boost transistor; a pulse width modulation (PWM) comparator configured to receive outputs of the multiplier and the oscillator and current sense ramp generator, and a driver that connects the output of the PWM comparator with the buck transistor and the boost transistor to synchronously regulate the time pattern of the on/off status of the buck transistor and the boost transistor.

In some embodiments, the power factor correction converter in a buck-boost configuration further comprises the LED string is configured to be a high-side connection when the other end of the current sense resistor is connected to the second diode, the other end of the optional disconnect switch is connected to the anode of the LED string, and the cathode of the LED string is connected to the ground, and the buck-boost PFC regulator further comprises a pair of resistor dividers connected to the output of the set-up circuit; a reference voltage corresponding to an intended voltage across the current sense resistor; an error amplifier (EA) configured to compare the reference voltage with a second level voltage transmitted by a differential amplifier (DIF); a multiplier configured to receive outputs of the pair of resistor dividers and the EA; an oscillator and current sense ramp generator configured to receive the output of the boost transistor; a pulse width modulation (PWM) comparator configured to receive outputs of the multiplier and the oscillator and current sense ramp generator, and a driver that connects the output of the PWM comparator with the buck transistor and the boost transistor to synchronously regulate the time pattern of the on/off status of the buck transistor and the boost transistor.

In some embodiments, if the second level voltage is less than the reference voltage, the EA amplifies its output via the multiplier, and the PWM comparator extends the duty cycle to boost the first level voltage; or if the second level voltage is greater than the reference voltage, the PWM comparator shortens the duty cycle to reduce the first level voltage. This adjusts the voltage across the load in such a way as to maintain a constant voltage drop across the current sense resistor, thus ensuring the flow of a constant current through the load.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of power factor correction (PFC) converter with current regulated output.

Figure 1:
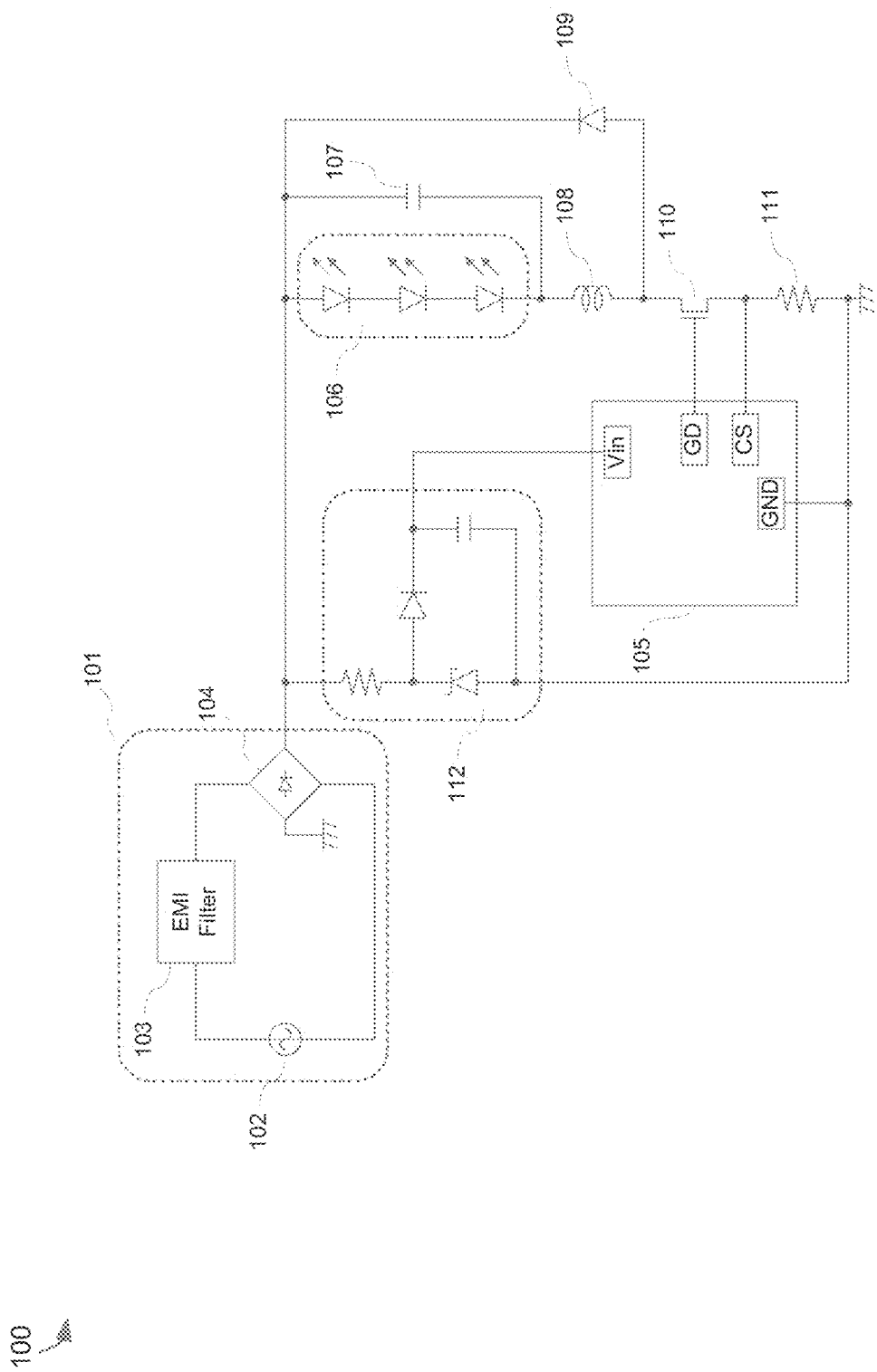
FIG. 1 illustrates an LED lighting driving configuration with a same AC current flowing across an LED string and a coil in the prior art.
Figure 2:
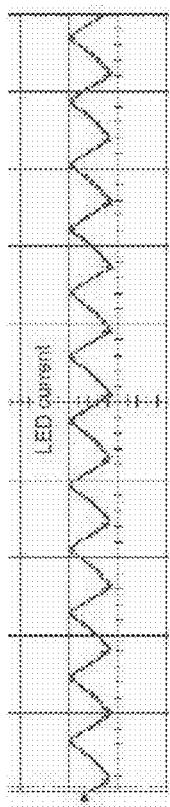
FIG. 2 illustrates an LED current that varies over a wide range with peak and valley levels in the prior art.
Figure 3:
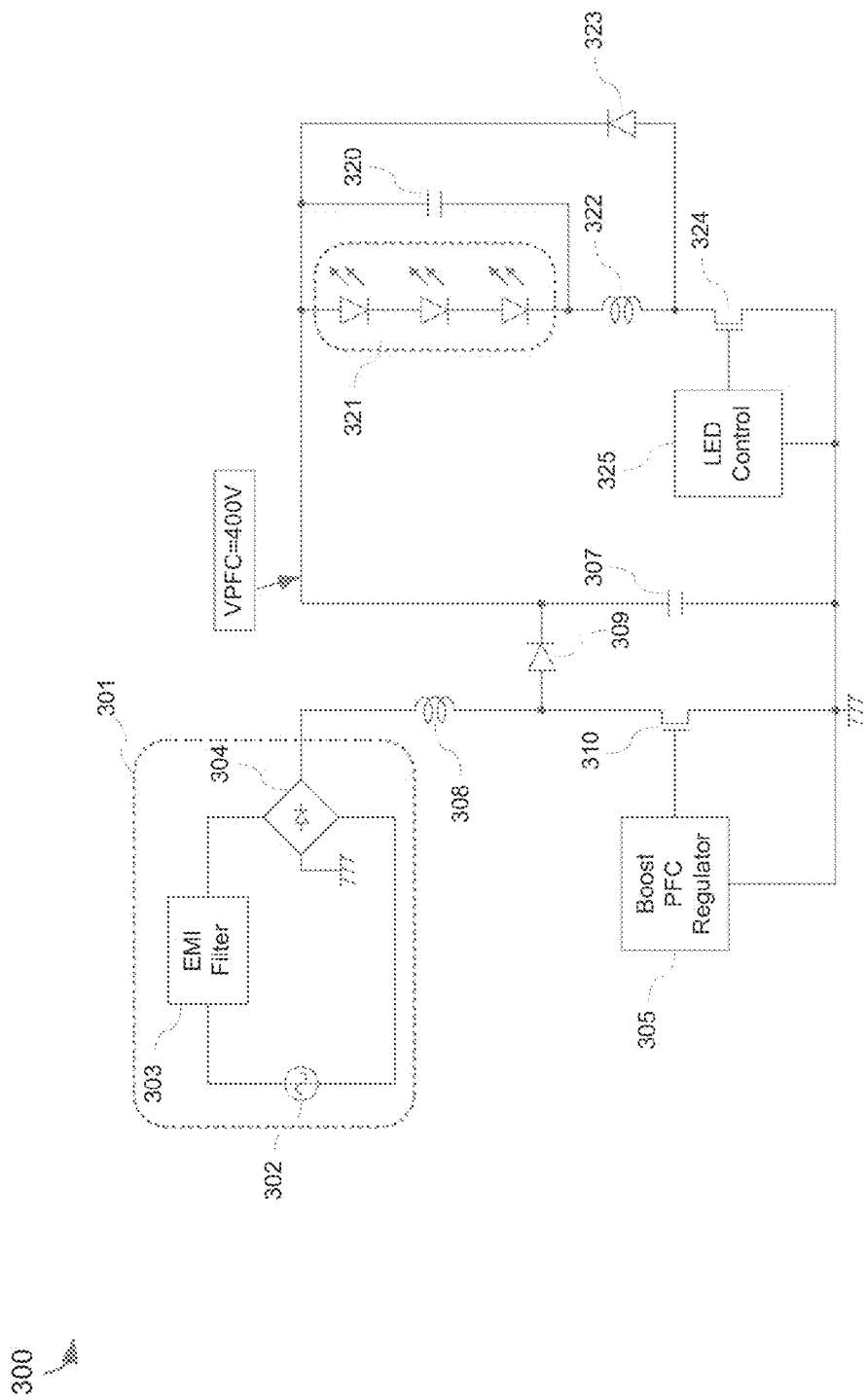
FIG. 3 illustrates another LED lighting driving configuration with separated AC current and LED current in the prior art.
Figure 4:
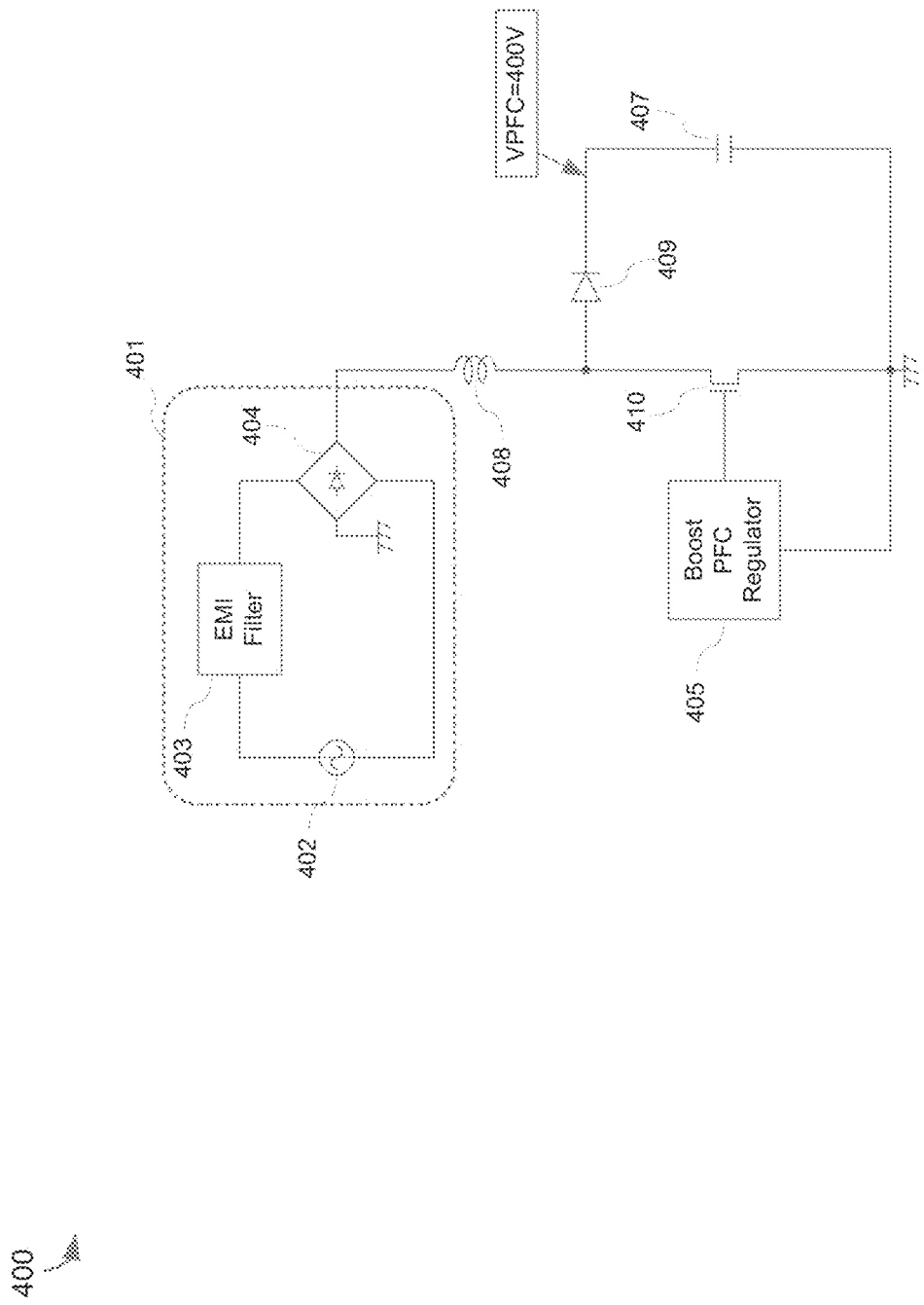
FIG. 4 illustrates a boost converter with higher output voltage than input voltage in the prior art that is done in order to achieve high PFC while covering the Universal AC input line voltage.
Figure 5:
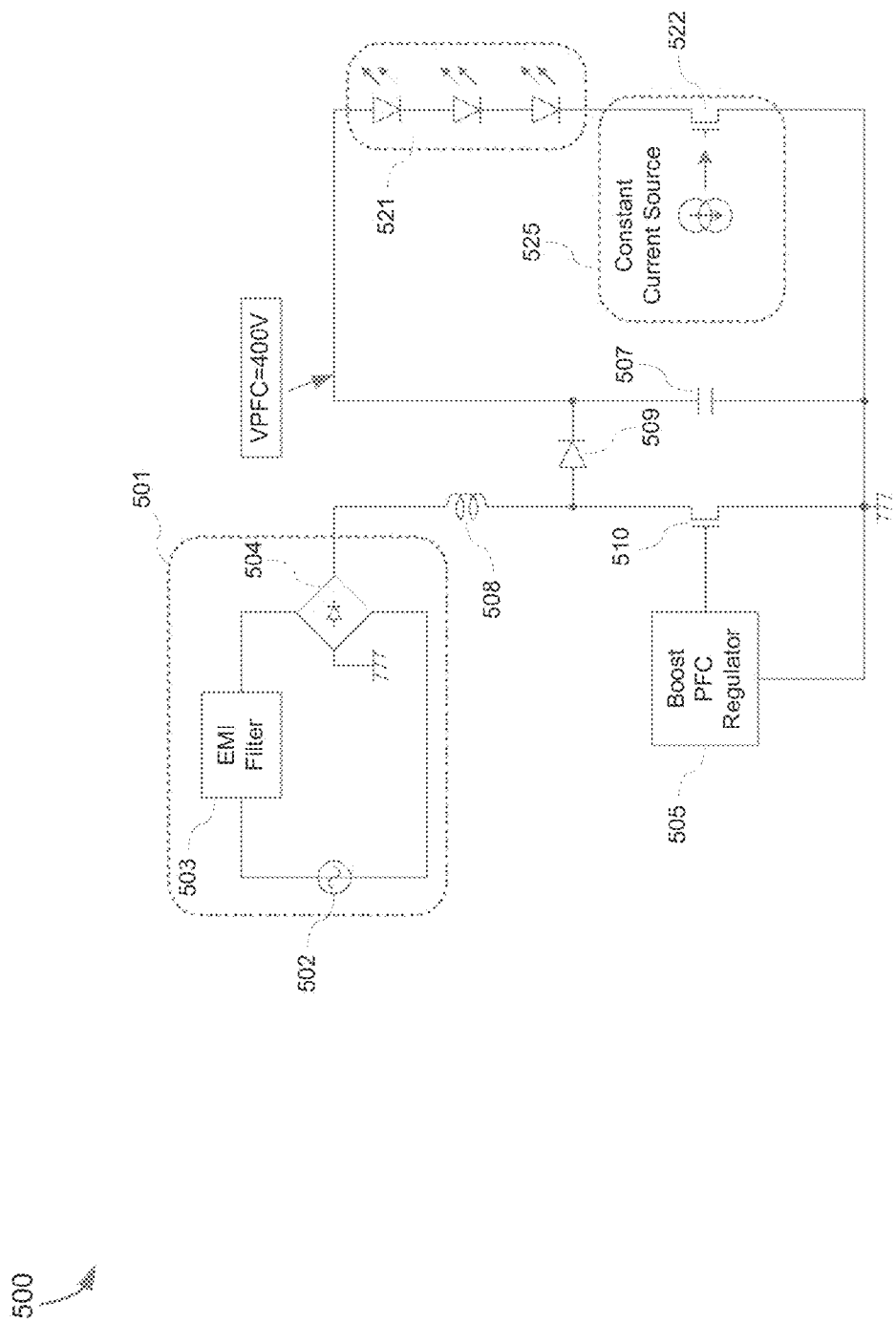
FIG. 5 illustrates an exemplary power factor correction (PFC) converter in a boost configuration in accordance with the present invention.

FIG. 5 is an exemplary embodiment 500 of a power factor correction (PFC) converter in a boost configuration in accordance with the present invention. The exemplary embodiment 500 may comprise a set-up circuit 501, a boost PFC regulator 505, a coil 508, a transistor 510, a diode 509, a capacitor 507, an LED string comprising a plurality of LEDs connected in series and a constant current source 525. The set-up circuit may further comprise an AC source, an electromagnetic interference (EMI) filter and a diode bridge 504. A high DC level of 400v, i.e., VPFC level is outputted to the anode of the LED string. However, as each LED has approximate 3v voltage drop at a room temperature, the exemplary embodiment 500 requires a large number of LEDs to be used in order to achieve high efficiency. Fewer diodes used in the LED string would lead to extra voltage drop across the constant current source which means less efficiency.

Figure 6:
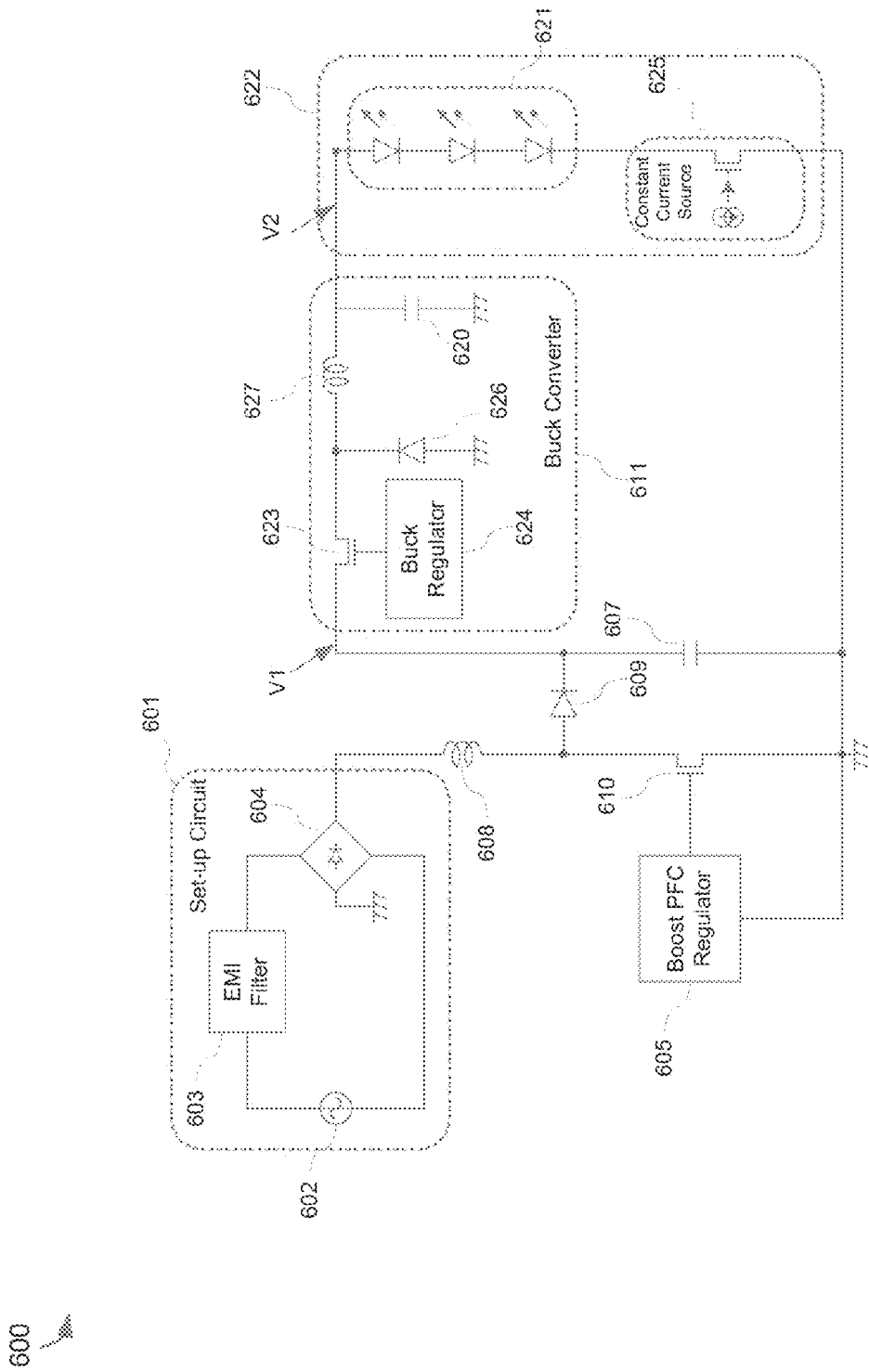
FIG. 6 illustrates an exemplary embodiment of a power factor correction (PFC) converter in a boost configuration followed by a buck regulator with a low-side connected load in accordance with the present invention.

FIG. 6 is an exemplary embodiment of a power factor correction (PFC) converter in a boost configuration followed by a buck regulator with a low-side connected load in accordance with the present invention. This approach improves the solution of FIG. 5 in that a lower number of diodes in the LED string can be used while still achieving high efficiency since the second coil helps store energy and avoid losses. The exemplary embodiment 600 comprises a set-up circuit 601, a first coil 608, a first transistor 610, a boost PFC regulator 605, a first diode 609, a first capacitor 607, a buck converter 611 and a load 622. The set-up circuit 601 may further comprise an alternating current (AC) source 602, an electromagnetic interface (EMI) filter 603, and a diode 604. The first coil 608 may receive a rectified current from the diode 604. The boost PFC regulator 605 may regulate a first time pattern of an on/off status of the first transistor 610. The buck converter 611 may receive a first level voltage v1 from the first diode 609 and convert it to a second level voltage v2. The buck converter 611 may further comprise a second transistor 623, a buck regulator 624, a second diode 626, a second coil 627 and a second capacitor 620.

In some embodiments, the load 622 may further comprise a light-emitting diode (LED) string 621 comprising a plurality of diodes connected in series and a constant current source 625 configured to maintain a constant load current or an arbitrarily modulated load current flowing through the LED string 621. When the LED string is applied as load, this includes linear, logarithmic and pulse width modulation (PWM) dimming. In some embodiments, the load 622 may be configured to be a low-side connection when the anode of the LED string 621 is connected to the second coil 627, the cathode of the LED string 621 is connected to one end of the constant current source 625, and the other end of the constant current source 625 is connected to the ground. In yet another embodiments, the load 622 may be configured to be a high-side connection when one end of the constant current source 625 is connected to the second coil 627, the other end of the constant current source 625 is connected to the anode of the LED string 621, and the cathode of the LED string 621 is connected to the ground.

Figure 7:
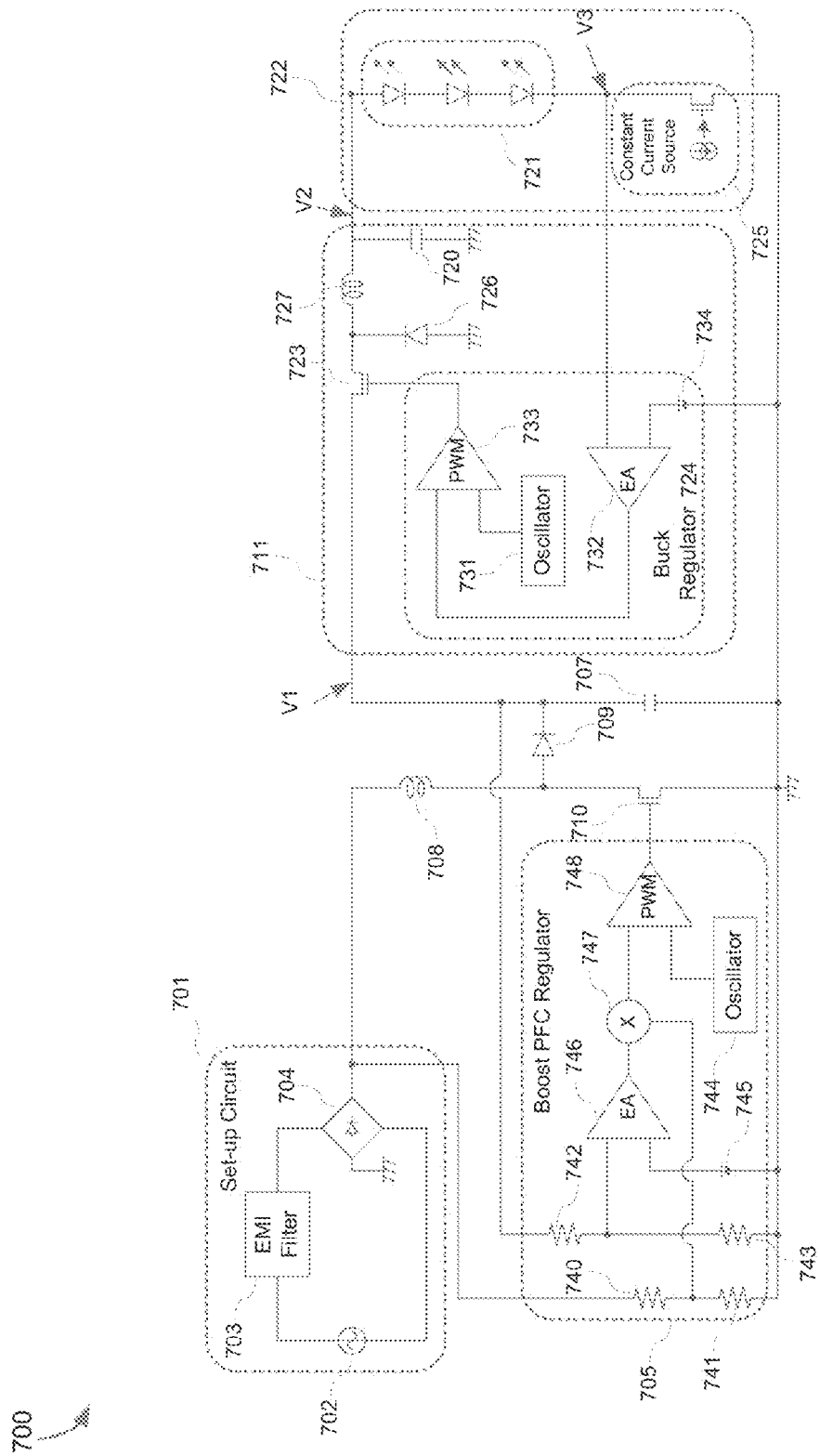
FIG. 7 illustrates an exemplary embodiment of a power factor correction (PFC) converter in a boost configuration followed by a buck regulator with detailed configuration of a boost PFC regulator, a buck regulator and a low-side connected load in accordance with the present invention.

FIG. 7 is an exemplary embodiment of a power factor correction (PFC) converter in a boost configuration followed by a buck regulator as illustrated in exemplary embodiment 600 with detailed configuration of a boost PFC regulator, a buck regulator and a low-side connected load in accordance with the present invention. In the exemplary embodiments 700, the boost PFC regulator 705 may further comprise a first pair of resistor dividers 741, a second pair of resistor dividers 742, a first reference voltage 745 corresponding to the first level voltage v1 at the output of a first diode 709, a first error amplifier (EA) 746, a multiplier 747, a first oscillator 744 and a first pulse width modulation (PWM) comparator 748. An AC voltage from the set-up circuit 701 may be inputted to the boost PFC regulator 705 via the first pair of resistor dividers 741. The divided voltage may be applied to the multiplier 747 as one input. The first EA 746 may receive the first level voltage v1 via the second pair of resistor dividers 742 and compare it with the first reference voltage 745. If the first level voltage v1 is less than the first reference voltage, the first EA 746 amplifies its output via the multiplier 747, and the first PWM comparator 748 extends a first duty cycle to boost the first level voltage v1; or if the first level voltage v1 is greater than the first reference voltage, the first PWM comparator 748 shortens the first duty cycle to reduce the first level voltage v1. The above regulation scheme of the boost PFC regulator 705 forces an AC current to follow an AC voltage in order to achieve a high PFC performance (i.e., a high PFC level). The high PFC performance that can be achieved is independent from the load.

In some embodiments when the load 722 is in low-side connection, the buck regulator 724 may further comprises a second reference voltage 734 corresponding to an intended voltage drop across the constant current source 725, a second EA 732, a second oscillator 731 and a second PWM comparator 733. The second reference voltage 734 may be configured to be high enough to keep the constant current source 725 with sufficient headroom to proper operation. The second EA 732 may receive a third level voltage v3 at the cathode of the LED string 721 and compare it with the second reference voltage v2. If the third level voltage v3 is less than the second reference voltage, the second EA 732 amplifies its output, and the second PWM comparator 733 extends a second duty cycle to boost the second level voltage v2 at the anode of the LED string 722; or if the third level voltage v3 is greater than the second reference voltage, the second PWM comparator 733 shortens the second duty cycle to reduce the second level voltage v2. In the above regulation scheme of the buck regulator 724, the third level voltage v3 at the cathode of the LED string 721 is fed back into the second EA 732 to ensure the first level voltage v1 is sufficiently stepped down to the second level voltage v2 such that the constant current source 725 has enough headroom voltage not to get saturated. The second level voltage v2 is determined by the number of LEDs in the string plus the voltage drop across the constant current source, thus ensuring high efficiency operation.

In some embodiments, there may be more ripple at the output of the capacitor 720 if the capacitor 720 is configured to be of a smaller value. The third level voltage v3 at the cathode of the LED string 721 that is outputted to the negative pin of the EA 732 may be configured to stay above the headroom voltage including the presence of ripple. The EA 732 may be configured with a very slow feedback control loop as to regulate the average of a signal with such low frequency ripple.

Figure 8:
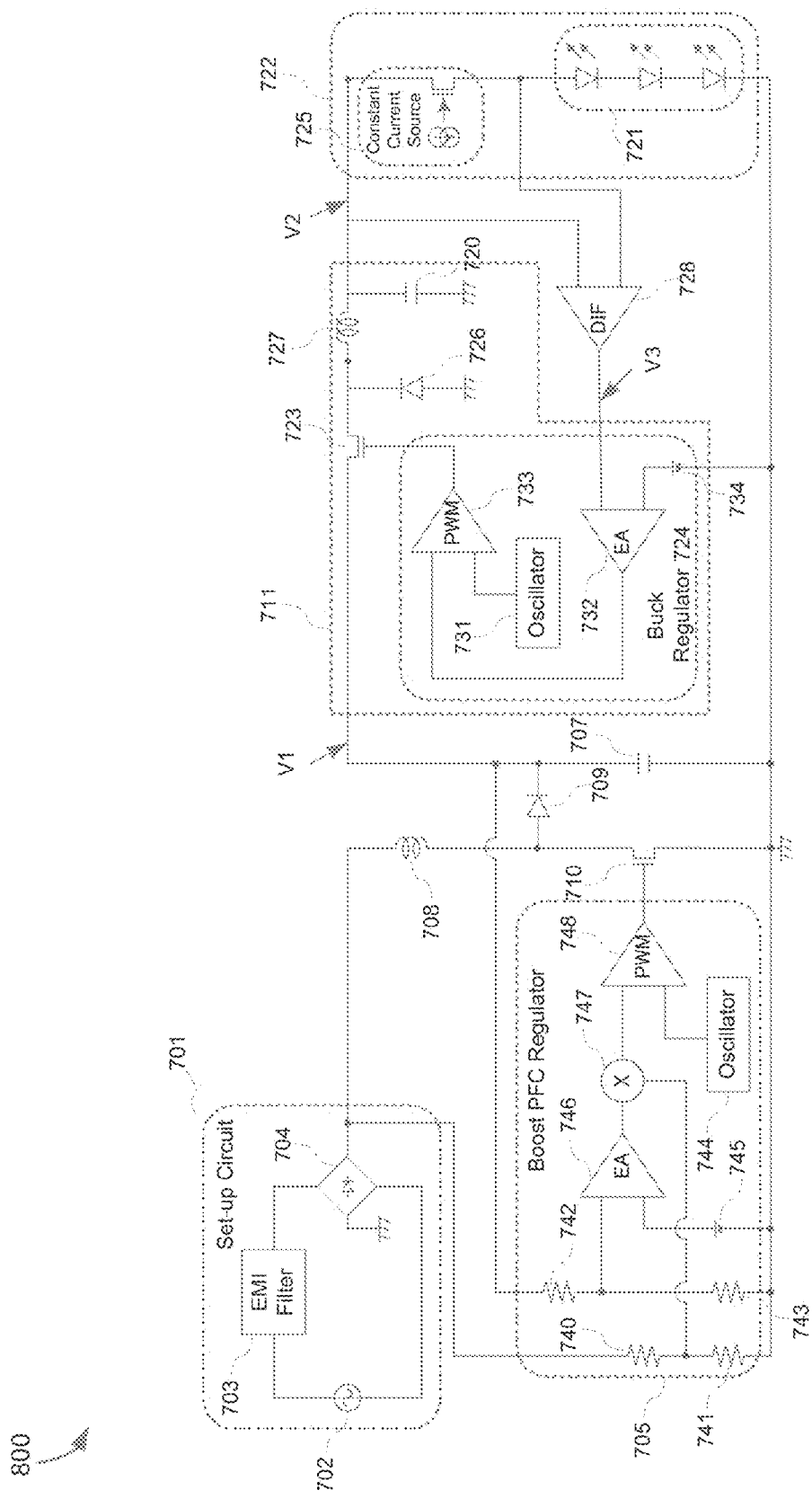
FIG. 8 illustrates an exemplary embodiment of a power factor correction (PFC) converter in a boost configuration followed by a buck regulator with detailed configuration of a boost PFC regulator, a buck regulator and a high-side connected load in accordance with the present invention.

Alternatively, in yet another embodiment, the load 722 may be in a high-side connection. FIG. 8 illustrates an exemplary embodiment of a power factor correction (PFC) converter in a boost configuration followed by a buck regulator with detailed configuration of a boost PFC regulator, a buck regulator and a high-side connected load in accordance with the present invention. The exemplary embodiment 800 may have the same configuration as the exemplary embodiment 700 except that the load 722 is in a high-side connection. The embodiment 800 may further comprise a differential amplifier (DIF) 728. The DIF 728 may receive inputs from both ends of the constant current source 725, take the difference between the inputs, refer the difference to ground, and output the third level voltage v3 to the second EA 732 for regulation. The regulation scheme of the buck regulator 724 in the high-side connection embodiment may be the same as in the low-side connection embodiment, and may achieve the same benefits as the low-side connection embodiment.

In any one of the exemplary embodiment 700 and the exemplary embodiment 800, when the first transistor 710 is on, the first coil 708 accumulates received current, and when the first transistor 710 is off, the first coil 708 transmits accumulated current and outputs the first level voltage v1 to the buck converter 711 via the first diode 709. Such first level voltage v1 is about 400v in order to cover the Universal AC line input range, and therefore achieve a high PFC by allowing AC current to follow the AC line envelope.

In any one of the exemplary embodiment 700 and the exemplary embodiment 800, the boost PFC regulator 705 may be configured to achieve a high power factor correction level by regulating the first time pattern of the on/off status of the first transistor 710 in order to force the AC current to follow the AC voltage to achieve a high PFC level. The high power factor correction level that can be achieved is approximately equal to 0.96 or is greater than 0.96, and is independent from the load.

In any one of the exemplary embodiment 700 and the exemplary embodiment 800, the first level voltage v1 is greater than the second level voltage v2, and the second level voltage v2 is independent of the first level voltage v1 and the PFC performance. The second level voltage v2 is determined by the number of LEDs in the string plus the voltage drop across the constant current source.

In any one of the exemplary embodiment 700 and the exemplary embodiment 800, the second level voltage v2 may be regulated according to a number of diodes in the LED string 721, and the second level voltage v2 may be regulated in a feedback loop comprising the buck converter 711, the LED string 721 and the constant current source 725.

In any one of the exemplary embodiment 700 and the exemplary embodiment 800, the constant load current or the arbitrarily modulated load current flowing through the LED string 721 and the regulation performance of the constant load current or the arbitrarily modulated load current flowing through the LED string 721 are both independent of the current flowing through the set-up circuit 701, the first level voltage v1 and the second level voltage v2 provided that the second level voltage v2 is sufficient (equal or greater than) to ensure enough headroom across the constant current source.

Figure 7A:
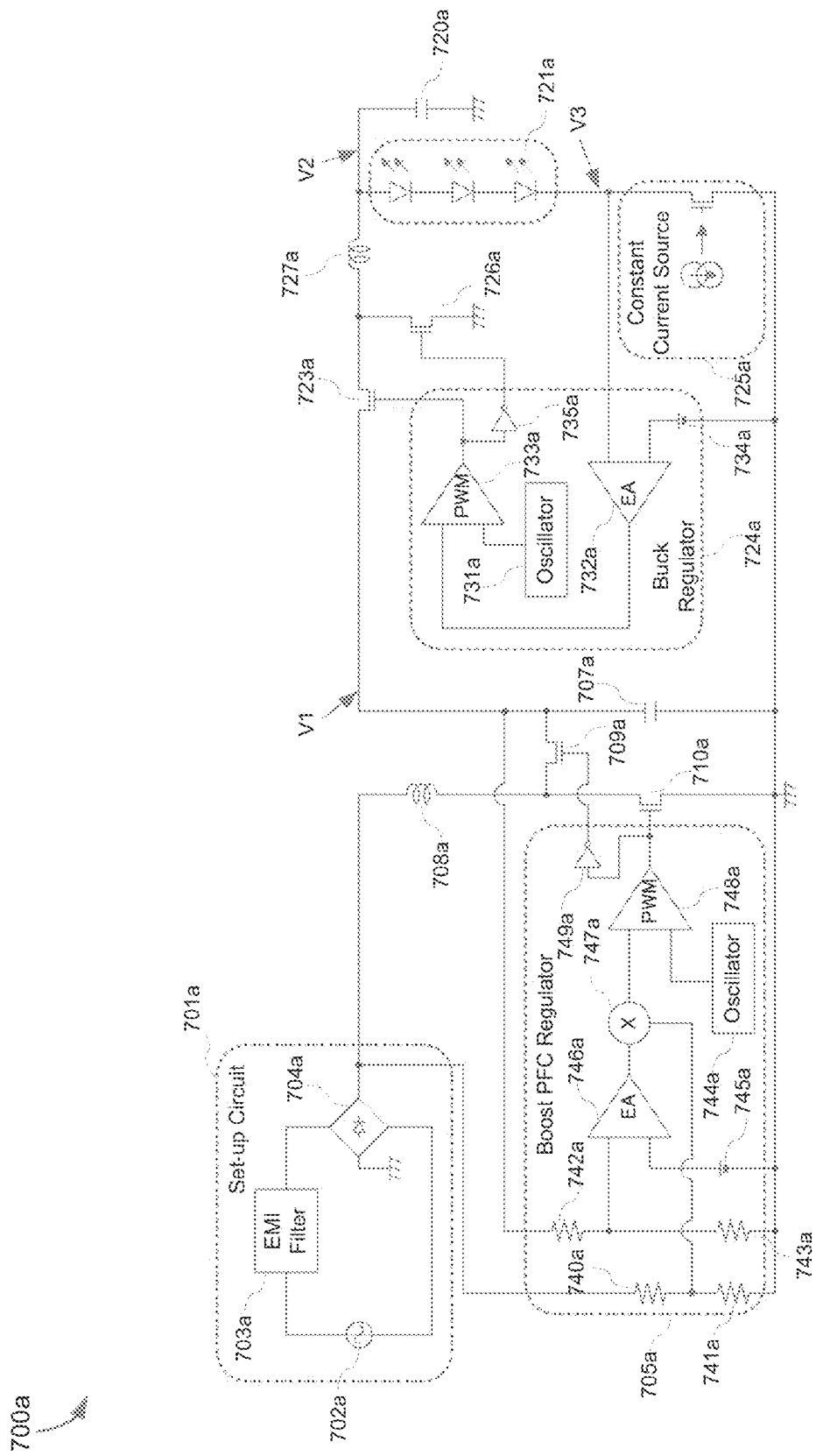
FIG. 7a illustrates an exemplary embodiment of a power factor correction (PFC) converter in a boost configuration followed by a buck regulator using synchronous rectifiers and a low-side connected load in accordance with the present invention.

Although the constant current source 725 should be kept with enough headroom voltage to ensure proper operation, excess headroom voltage may cause the system to be less efficient. In yet another embodiment, the first diode 709 and the second diode 726 may be replaced with two synchronous rectifiers. FIG. 7a illustrates an exemplary embodiment of a power factor correction (PFC) converter in a boost configuration followed by a buck regulator using synchronous rectifiers and a low-side connected load in accordance with the present invention. The exemplary embodiment 700a may have the same configuration as the exemplary embodiment 700 except that the first diode 709 and the second diode 726 may be replaced by a first synchronous rectifier 709a and a second synchronous rectifier 726a. In the exemplary embodiment 700a, the first synchronous rectifier 709a may connect to the first transistor 710a via a first inverter 749a and output the first level voltage v1; and the second synchronous rectifier 726a may connect to the second transistor via a second inverter 735a. With proper rectifier sizing for low Rdson, the voltage drop across the synchronous rectifier may be made smaller than the voltage drop across the diode, and thus improving the regulation efficiency.

The PFC converter in a boost configuration followed by a buck regulator are advantageous over the prior art at least in that the load current may be independent of the boost PFC regulator output VPFC (i.e., the first level voltage v1) and the power factor correction level when a minimum VPFC condition is satisfied. Further, the regulation of the load current may be independent of the boost PFC regulator output VPFC (i.e., the first level voltage v1) when a minimum VPFC condition is satisfied. Even further, independent of the PFC value, the regulation performance of the load current can still be independently pursued.

Figure 13:
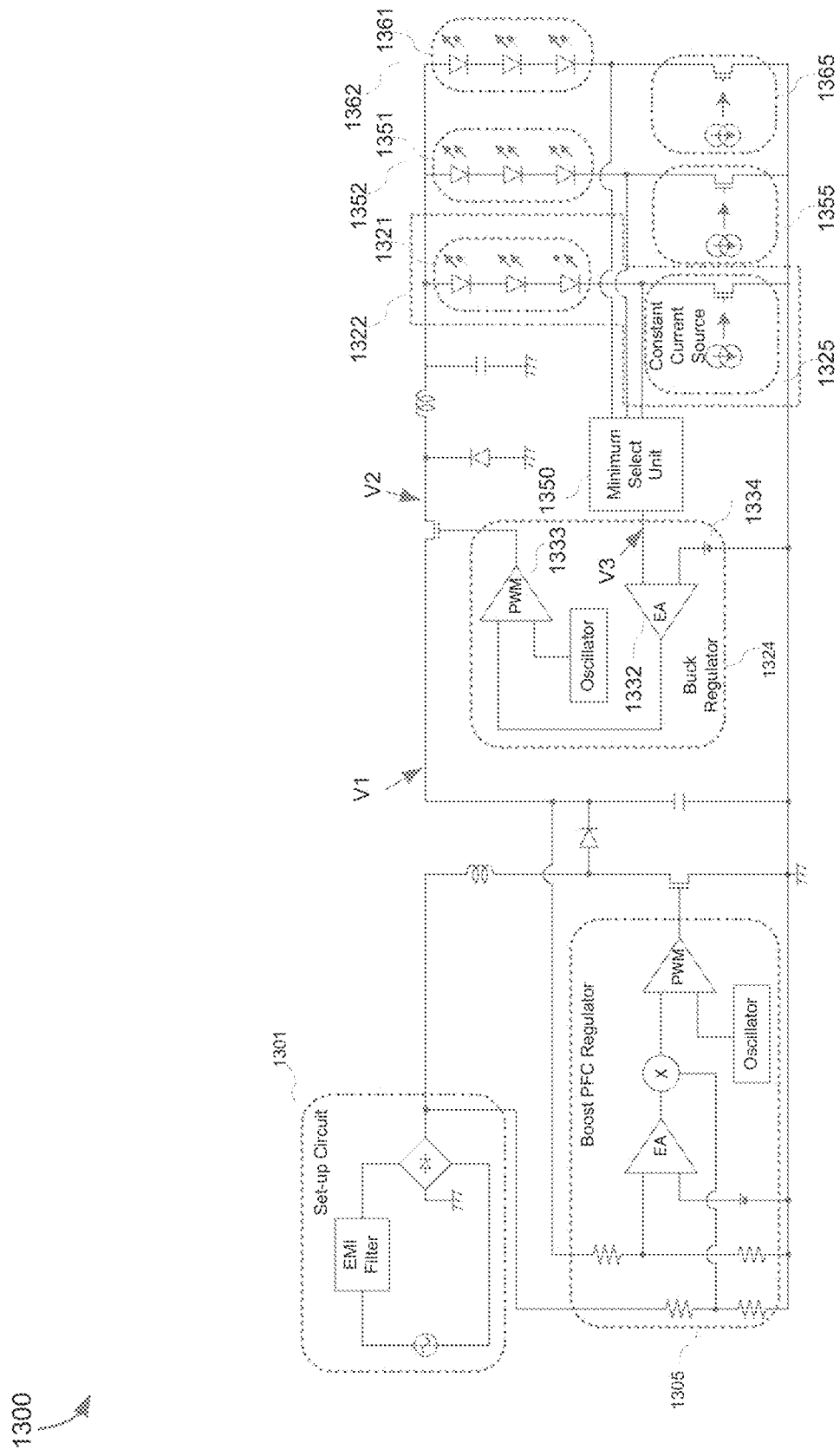
FIG. 13 illustrates an exemplary embodiment of a power factor correction (PFC) converter in a boost configuration followed by a buck regulator feeding multiple low side connected loads, each load consisting of an LED-string and a constant current source; a minimum select unit sends feedback to the converter in accordance with the present invention.

In yet another embodiment, the PFC converter in a boost configuration followed by a buck regulator may have a plurality of loads. FIG. 13 illustrates an exemplary embodiment 1300 of a power factor correction (PFC) converter in a boost configuration followed by a buck regulator using multi-string LEDs and a low-side connected load in accordance with the present invention. The exemplary embodiment 1300 may have the same configuration as the exemplary embodiment 700 except that a plurality of loads is connected to the buck converter. In the exemplary embodiment 1300, a plurality of loads 1322, 1352 and 1362 are connected in parallel. Each of the plurality of loads may further comprise a light-emitting diode (LED) string comprising a plurality of diodes connected in series, for example, 1321, 1351 and 1361; and a constant current source configured to maintain a constant load current or an arbitrarily modulated load current flowing through the LED string, for example, 1325, 1355 and 1365. When the LED string is applied as load, this includes linear, logarithmic and pulse width modulation (PWM) dimming. A second reference voltage 1334 may correspond to a lowest intended voltage drop across the plurality of loads 1322, 1352 and 1362.

In some embodiments when the plurality of loads 1322, 1352 and 1362 is in a low-side connection, the second EA 1332 may receive a third level voltage v3 via a minimum select unit 1350, and compare it with the second reference voltage 1334. The minimum select unit 1350 may receive a plurality of voltage drops at the cathodes of the plurality of LED string 1325, 1355 and 1365, select the lowest intended voltage drop across the plurality of constant current sources, and transmit the lowest intended voltage drop to the second EA 1332 as the third level voltage v3. If the third level voltage v3 is less than the second reference voltage 1334, the second EA 1332 amplifies its output, and the second PWM comparator extends a second duty cycle to boost the second level voltage v2; or if the third level voltage v3 is greater than the second reference voltage, the second PWM comparator 1333 shortens the second duty cycle to reduce the second level voltage v2.

Alternatively, in some embodiments, the plurality of loads 1322, 1352 and 1362 may be in a high-side connection. Similar to the exemplary embodiment 800 when a single load is used, the embodiment of multi-string LEDs with multiple high-side connected loads may further comprise a differential amplifier (DIF) to receive inputs from both ends of one constant current source and output a third level voltage v3 to the second EA for regulation. The regulation scheme of the buck regulator in such embodiment may be the same as in the low-side connection embodiment, and may achieve the same benefits as the low-side connection embodiment.

The exemplary embodiment 1300 of a PFC converter in a boost configuration followed by a buck regulator using multi-string LEDs may provide proper load current regulation for all not only one LED string at all times. Further, the plurality of load currents flowing through the multiple loads connected in parallel can be set independently from one another as long as the constant current source in each LED string has enough headroom to operate properly.

Figure 14:
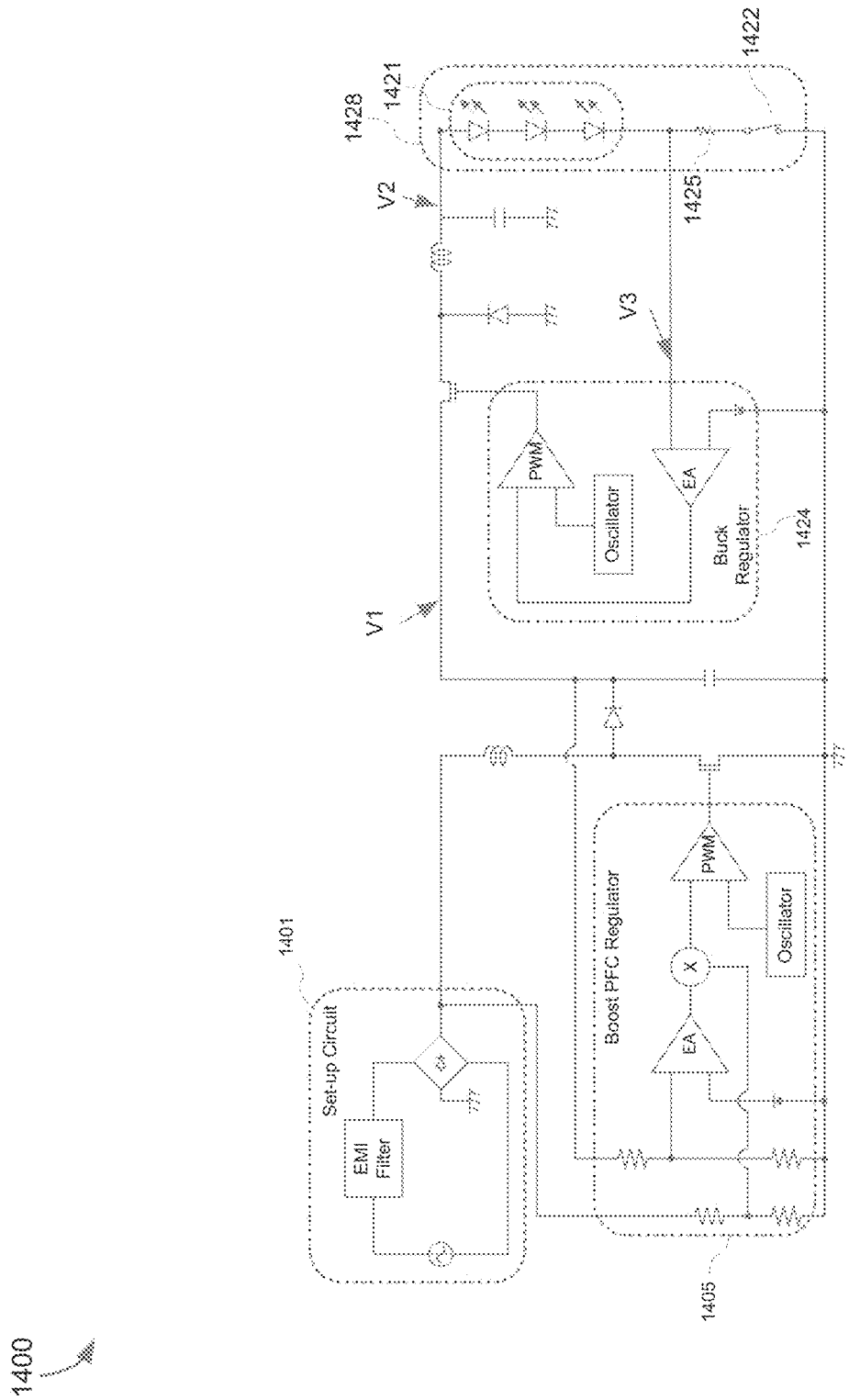
FIG. 14 illustrates an exemplary embodiment of a power factor correction (PFC) converter in a boost configuration followed by a buck regulator using a sense resistor and a low-side connected load in accordance with the present invention.

In yet another embodiment, the constant current source of the load in a PFC converter in a boost configuration followed by a buck regulator may be replaced by a current sense resistor and an optional disconnect switch. FIG. 14 illustrates an exemplary embodiment 1400 of a power factor correction (PFC) converter in a boost configuration followed by a buck regulator using a current sense resistor and a low-side connected load in accordance with the present invention. In the exemplary embodiment 1400, the load 1428 may comprise a light-emitting diode (LED) string 1421 comprising a plurality of diodes connected in series, a current sense resistor 1425 and an optional disconnect switch 1422 with one end connected to one end of the current sense resistor.

In some embodiments, the load 1428 may be a low-side connection when the anode of the LED string 1421 is connected to the second coil 1427, the cathode of the LED string 1421 is connected to the other end of the current sense resistor 1425, and the other end of the optional disconnect switch 1422 is connected to the ground. The second EA 1432 may receive a third level voltage v3 at the cathode of the LED string 1421 and compare it with a second reference voltage 1434 that corresponds to an intended voltage drop across the current sense resistor 1425. If the third level voltage v3 is less than the second reference voltage 1434, the second EA 1432 amplifies its output, and the second PWM comparator 1433 extends a second duty cycle to boost the second level voltage v2; or if the third level voltage v3 is greater than the second reference voltage 1434, the second PWM comparator 1433 shortens the second duty cycle to reduce the second level voltage v2. The regulation of the second voltage level v2 is achieved when the load current times the current sense resistor equals to the second reference voltage 1434.

Alternatively, in some embodiments, the load 1428 may be a high-side connection when the other end of the current sense resistor 1425 is connected to the second coil 1427, the other end of the optional disconnect switch 1422 is connected to the anode of the LED string 1421, and the cathode of the LED string 1421 is connected to ground. Similar to the exemplary embodiment 800 when a constant current source is used, the embodiment using sense resistor and a high-side connected load may further comprise a differential amplifier (DIF) to receive inputs from both ends of the current sense resistor and output a third level voltage v3 to the second EA for regulation. The regulation scheme of the buck regulator in such an embodiment may be the same as in the low-side connection embodiment, and may achieve the same benefits as the low-side connection embodiment.

Figure 9:
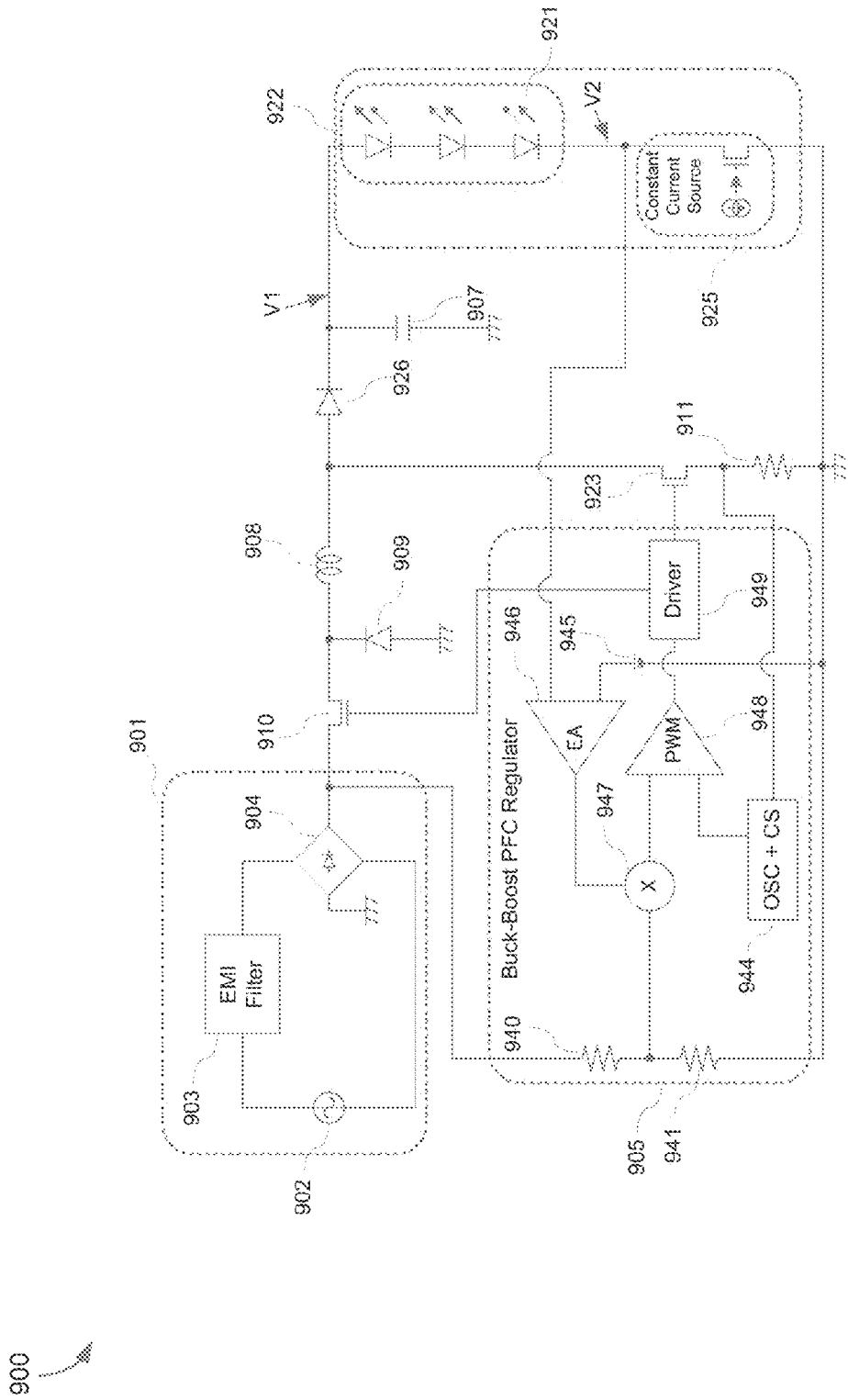
FIG. 9 illustrates an exemplary embodiment of a power factor correction (PFC) converter in a buck-boost configuration with a low-side connected load in accordance with the present invention.

FIG. 9 illustrates an exemplary embodiment 900 of a power factor correction (PFC) converter in a buck-boost configuration with a low-side connected load in accordance with the present invention. In exemplary embodiment 900, a PFC converter may comprise a set-up circuit 901, a buck transistor 910, a first diode 909, a boost transistor 923, a resistor 911 configured for over-current protection, a coil 908, a buck-boost PFC regulator 905, a second diode 926, a capacitor 907 and a load 922. The set-up circuit 901 may further comprise an AC source 902, an EMI filter 903 and a diode bridge 904. The buck-boost PFC regulator 905 may regulate a time pattern of an on/off status of the boost transistor 923 and the buck transistor 910 synchronously. The buck transistor 910 may receive a rectified current from the set-up circuit 901. If the input voltage from the set-up circuit 901 is high, the buck transistor 910 may step down a high input voltage in a circuitry comprising the first diode 909 and the coil 908. If the input voltage from the set-up circuit 901 is low, the buck-boost PFC regulator 905 may boost the voltage level by accumulating energy in the coil 908 that may be further transferred to the capacitor 907 via the second diode 926.

The load 922 may further comprise a light-emitting diode (LED) string 921 comprising a plurality of diodes connected in series and a constant current source 925 configured to maintain a constant load current or an arbitrarily modulated load current flowing through the LED string 921. When the LED string is applied as load, this includes linear, logarithmic and pulse width modulation (PWM) dimming. In some embodiments, the load 922 is configured to be a low-side connection when the anode of the LED string 921 is connected to the second diode 926, the cathode of the LED string 921 is connected to one end of the constant current source 925, and the other end of the constant current source 925 is connected to ground. In yet another embodiment, the load 922 is configured to be a high-side connection when one end of the constant current source 925 is connected to the second diode 926, the other end of the constant current source 925 is connected to the anode of the LED string 921, and the cathode of the LED string 921 is connected to ground.

In some embodiments, when the buck transistor 910 and the boost transistor 923 are on synchronously, the coil 908 may accumulate received current, and when the buck transistor 910 and the boost transistor 923 are off synchronously, the coil 908 may transmit accumulated current and output the first level voltage v1 via the second diode 926. The first level voltage v1 may deliver a high PFC performance (i.e., a PFC level of approximate 0.96), and the voltage level of v1 may be determined by the load so as to maintain the regulation performance of the load current flowing through the LED string and the constant current source.

In some embodiments, the buck-boost PFC regulator 905 may be configured to achieve a high power factor correction level by regulating the time pattern of the on/off status of the buck transistor 910 and the boost transistor 923 synchronously, and the high power factor correction level is configured to be approximately equal to 0.96 or greater than 0.96 in order to force the AC current to follow the AC voltage to achieve the high PFC performance. In some embodiments, the high PFC performance that can be achieved may be independent from the load, and further independent from the first level voltage v1.

In some embodiments, the first level voltage v1 may be regulated according to a number of diodes in the LED string 921, and may be regulated in a feedback loop comprising the second diode 926, the capacitor 907, the LED string 921 and the constant current source 925. In some embodiments, the first level voltage v1 may be independent from the AC input and the current flowing through the set-up circuit.

In some embodiments, the load current flowing through the LED string 921 may be independent from the current flowing through the set-up circuit 901, the first level voltage v1 and the PFC performance. In yet another embodiment, the regulation performance of the load current may be independent from the current flowing through the set-up circuit 901, the first level voltage v1 and the PFC performance.

In some embodiments, the buck-boost PFC regulator 905 may further comprise a pair of resistor dividers 940, a reference voltage 945 corresponding to an intended voltage across the load 922, an EA 946, a multiplier 947, an oscillator and current sense ramp generator 944, a PWM comparator 948 and a driver 949. The driver 949 connects the output of the PWM comparator 948 with the buck transistor 910 and the boost transistor 923 to synchronously regulate the time pattern of an on/off status of the buck transistor 910 and the boost transistor 923. An AC voltage from the set-up circuit 901 may be inputted to the buck-boost PFC regulator 905 via the pair of resistor dividers 940. The divided voltage may be applied to the multiplier 947 as one input. In some embodiments when the load is in low-side connection, the EA 946 may receive a second level voltage v2 at the cathode of the LED string 921 and compare it with the first reference voltage 945. If the second level voltage v2 is less than the reference voltage 945, the EA 946 amplifies its output via the multiplier 947, and the PWM comparator 948 extends the duty cycle to boost the first level voltage v1; or if the second level voltage v2 is greater than the reference voltage 945, the PWM comparator 948 shortens the duty cycle to reduce the first level voltage v1. The above regulation scheme of the buck-boost PFC regulator 905 forces the AC current to follow the AC voltage in order to achieve a high PFC performance (i.e., a high PFC level). The high PFC performance that can be achieved is independent from the load. Further, the regulation of the buck-boost PFC controller 905 may maintain the VPFC output (i.e., the first level voltage v1) at an appropriate level in order to provide enough headroom voltage for the constant current source 925.

Figure 9A:
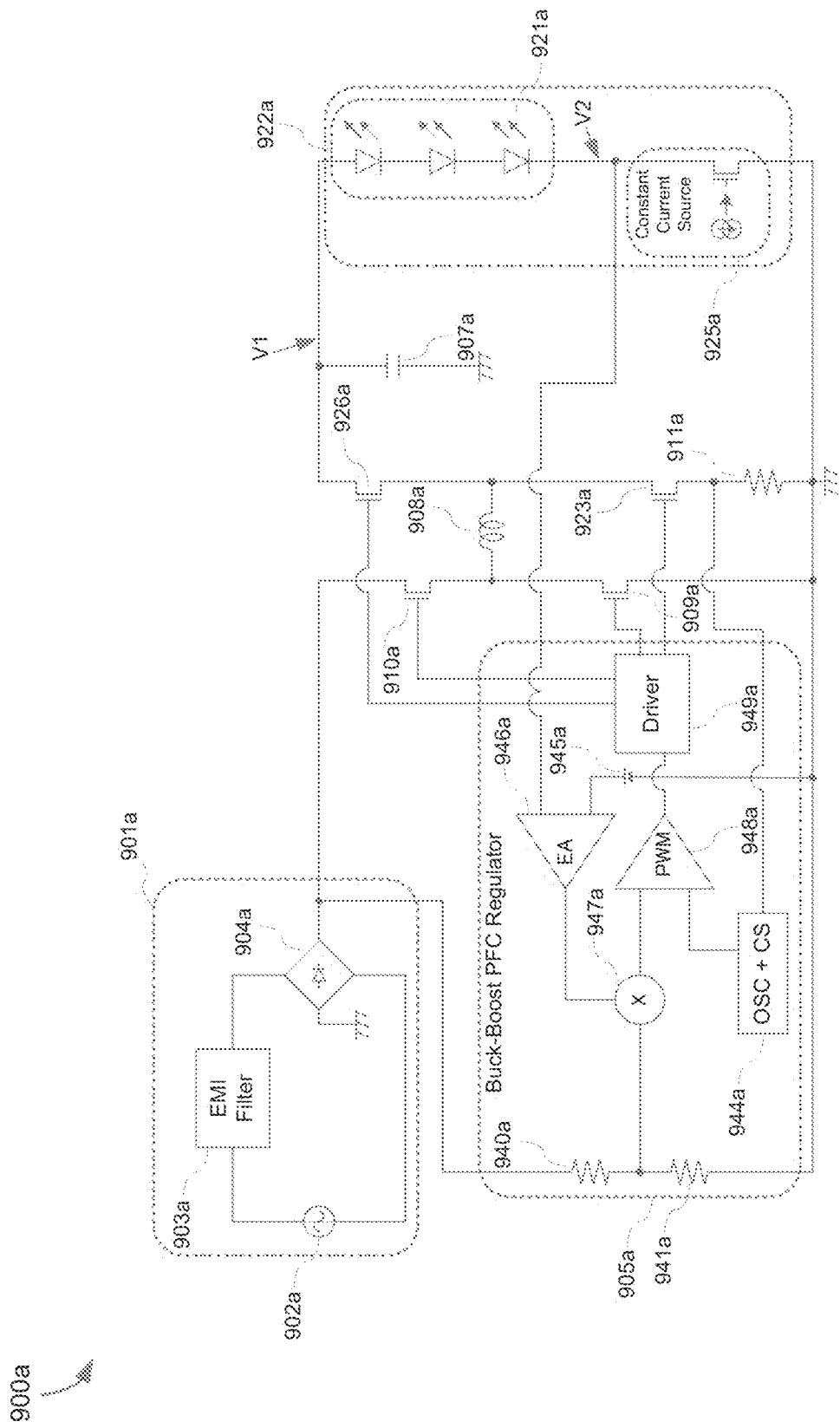
FIG. 9a illustrates an exemplary embodiment of a power factor correction (PFC) converter in a buck-boost configuration using synchronous rectifiers and a low-side connected load in accordance with the present invention.
Figure 9B:
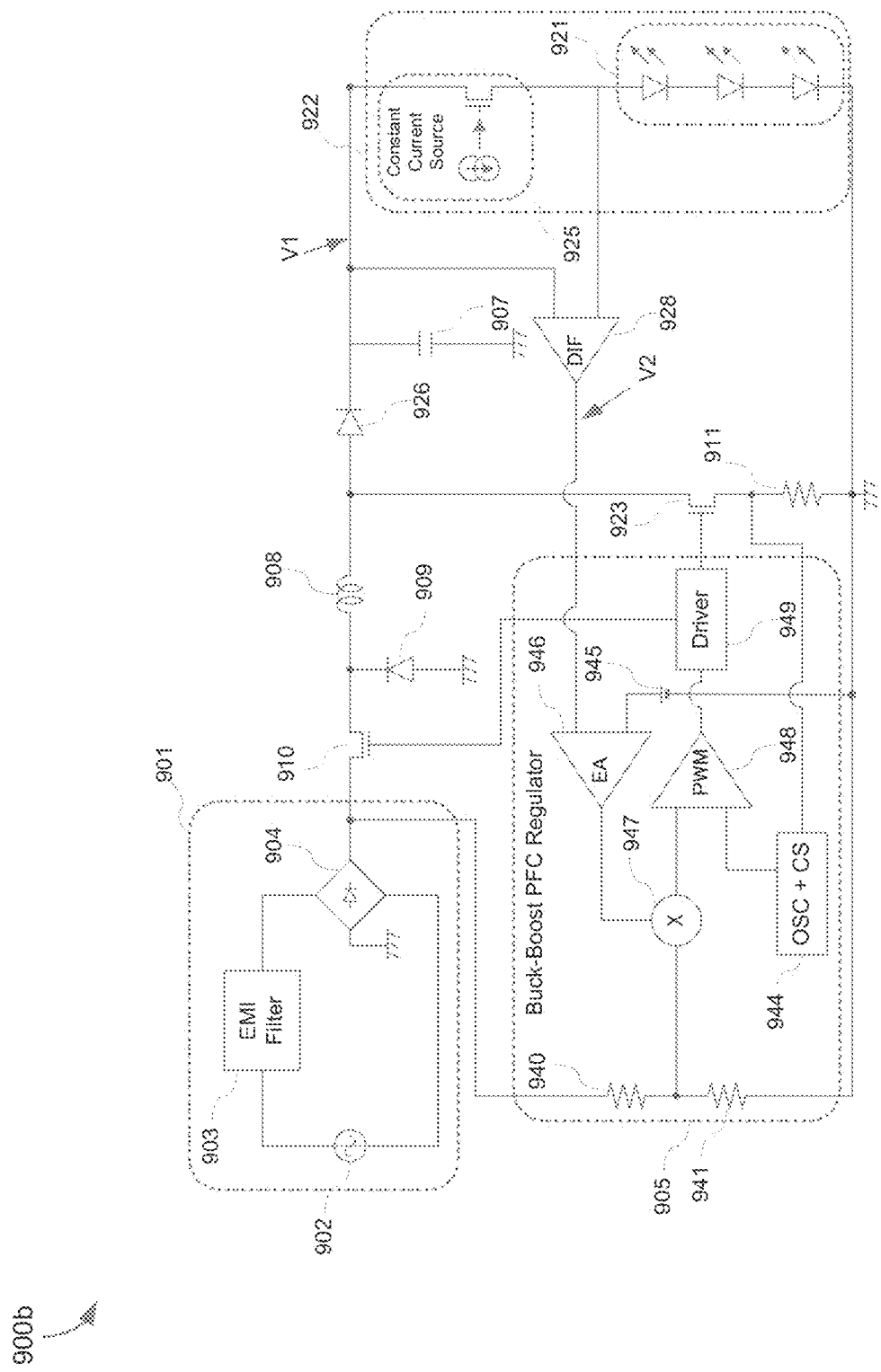
FIG. 9b illustrates an exemplary embodiment of a power factor correction (PFC) converter in a buck-boost configuration with a high-side connected load in accordance with the present invention.

Alternatively, in yet another embodiment, the load 922 may be in high-side connection. FIG. 9b illustrates an exemplary embodiment 900b of a power factor correction (PFC) converter in a buck-boost configuration with a high-side connected load in accordance with the present invention. The exemplary embodiment 900b may have the same configuration as the exemplary embodiment 900 except that the load 922 is in a high-side connection. The embodiment 900b may further comprise a differential amplifier (DIF) 928. In the exemplary embodiment 900b, the DIF 928 may receive inputs from both ends of the constant current source 925, take the difference between the inputs, refer the difference to ground, and output the third level voltage v3 to the EA 946 for regulation. The regulation scheme of the buck-boost PFC regulator 905 in exemplary embodiment 900b may be the same as the regulation scheme in the low-side connected exemplary embodiment 900, and may achieve the same benefits as the low-side connected exemplary embodiment 900.

The PFC converter in a buck-boost configuration is advantageous over the prior art at least in that the regulation of the VPFC output (i.e., the first level voltage v1) may be separated from the regulation of the load current. The power factor may be corrected to a high PFC level regardless of the VPFC level. In some embodiments, a minimum VPFC level may be determined by a number of LEDs 921 in the LED string 925 and a headroom voltage that is desired for the constant current source 925. Therefore, provided that the minimum VPFC condition is satisfied, the load current and the regulation of the load current may be configured to be both independent from the VPFC level. Further, provided that the minimum VPFC condition is satisfied, the load current and the regulation of the load current may be configured to be both independent from the PFC level. Even further, although the PFC Converter in a buck-boost configuration is simplified significantly, the regulation performance of the load current can still be independently pursued.

Further, the PFC Converter in a buck-boost configuration is advantageous over the PFC Converter in a boost configuration followed by a buck regulator at least in that less circuitry elements are implemented, and only one coil is required to achieve the regulation performance. The PFC Converter in a buck-boost configuration can achieve the same high PFC level as the PFC Converter in a boost configuration followed by a buck regulator; and at the meantime, regulate the output of the buck-boost PFC regulator to satisfy the minimum VPFC condition necessary to provide enough headroom voltage for the constant current source.

In yet another embodiment, the first diode 909 and the second diode 926 of the PFC converter in a buck-boost configuration may be replaced with two synchronous rectifiers. FIG. 9a illustrates an exemplary embodiment 900a of a power factor correction (PFC) converter in a buck-boost configuration using synchronous rectifiers in accordance with the present invention. The exemplary embodiment 900a may have the same configuration as the exemplary embodiment 900 except that the first diode 909 and the second diode 926 are replaced with a first synchronous rectifier 909a and the second synchronous rectifier 926a, respectively. In exemplary embodiment 900a, the buck transistor 910a, the boost transistor 923a, the first synchronous rectifier 909a and the second synchronous rectifier 926a may all connect to the driver 949a. When the buck transistor 910a and the boost transistor 923a are synchronously on, the first synchronous rectifier 909a and the second synchronous rectifier 926a are synchronously off, and the coil 908a may accumulate current, and when the buck transistor 910a and the boost transistor 923a are synchronously turned off, the first synchronous rectifier 909a and the second synchronous rectifier 923a are synchronously turned on, and the coil 908a may transmit the accumulated current; and output the first level voltage v1 via the second synchronous rectifier 926a. With proper rectifier sizing for low Rdson, the voltage drop across the synchronous rectifier may be made smaller than the voltage drop across the diode, and thus improving the regulation efficiency.

In some embodiments, the buck-boost PFC regulator 905a may be configured to achieve a high power factor correction level by regulating synchronously the first time pattern of the on/off status of the buck transistor 910a and the boost transistor 923a, and the second time pattern of the on/off status of the first rectifier 909a and the second rectifier 926a in order to force the AC current to follow the AC voltage to achieve the high PFC performance. In some embodiments, the high power factor correction level is approximately equal to 0.96 or greater than 0.96.

In some embodiments, the first level voltage v1 is regulated in a feedback loop comprising the second rectifier 926a, the capacitor 907a, the LED string 921a and the constant current source 925a.

In some embodiments, the PFC converter in a buck-boost configuration using synchronous rectifiers as illustrated in exemplary embodiment 900a may achieve the same benefits as the PFC converter in a buck-boost configuration as illustrated in exemplary embodiment 900.

In some embodiments when the load 922a is in a low-side connection, the EA 946a may receive a second level voltage v2 from the cathode of the LED string 921a and compare it with the reference voltage 945a. If the second level voltage v2 is less than the reference voltage 945a, the EA 946a amplifies its output via the multiplier 947a, and the PWM comparator 948a extends the duty cycle to boost the first level voltage v1; or if the second level voltage v2 is greater than the reference voltage 945a, the PWM comparator 948a shortens the duty cycle to reduce the first level voltage v1. Alternatively, in some embodiments when the load 922a is in high-side connection, the voltages at both ends of the constant current source 925a are outputted to a differential amplifier (DIF). The DIF may further output the second level voltage v2 to the EA 946a for regulation. The regulation scheme of the PFC converter in a buck-boost configuration using synchronous rectifiers and a high-side connected load may be the same as the PFC converter in a buck-boost configuration using synchronous rectifiers and a low-side connected load illustrated in FIG. 9a, and may achieve the same benefits as the PFC converter in a buck-boost configuration using synchronous rectifiers and a low-side connected load.

Figure 10:
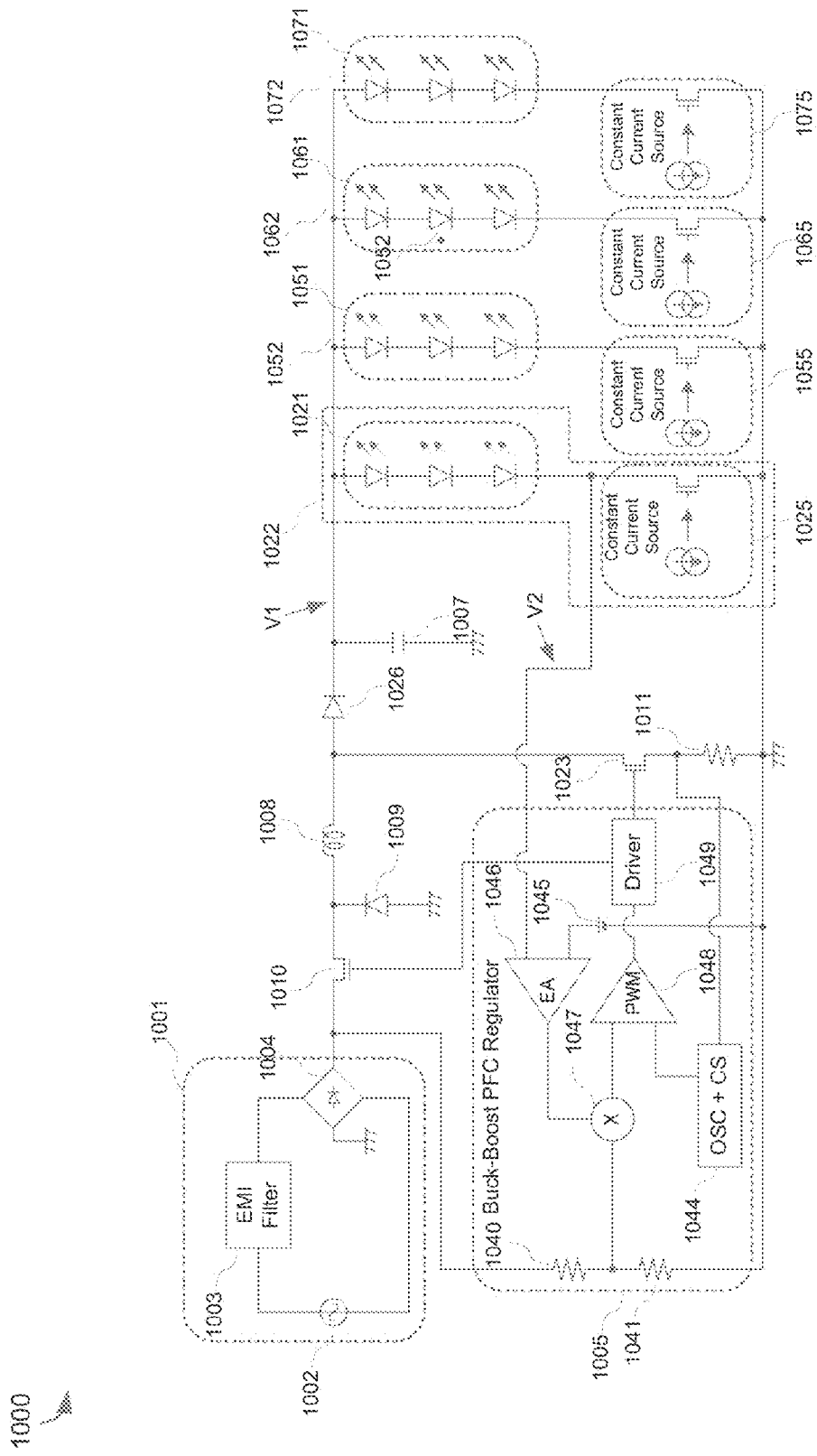
FIG. 10 illustrates an exemplary embodiment of a power factor correction (PFC) converter in a buck-boost configuration feeding multiple low side connected loads, each load consisting of an LED-string and a constant current source in accordance with the present invention.

In some embodiments, the PFC converter in a buck-boost configuration may comprise a plurality of loads. FIG. 10 illustrates an exemplary embodiment 1000 of a power factor correction (PFC) converter in a buck-boost configuration using multi-string LEDs and multiple low-side connected loads in accordance with the present invention. The exemplary embodiment 1000 may have the same configuration as the exemplary embodiment 900 except that a plurality of loads are connected to the second diode. In the exemplary embodiment 1000, a plurality of loads 1022, 1052, 1062 and 1072 are connected in parallel. Each of the plurality of loads may further comprise a light-emitting diode (LED) string comprising a plurality of diodes connected in series, for example, 1021, 1051, 1061 and 1071; and a constant current source configured to maintain a constant load current or an arbitrarily modulated load current flowing through the LED string, for example, 1025, 1055, 1065 and 1075. When the LED string is applied as load, this includes linear, logarithmic and pulse width modulation (PWM) dimming. A reference voltage 1045 may correspond to a lowest intended voltage drop across the plurality of loads 1022, 1052, 1062 and 1072.

In some embodiments when the plurality of loads 1022, 1052, 1062 and 1072 are in a low-side connection, the EA 1046 may receive a second level voltage v2 at the cathode of one of the plurality of LED string 1021, 1051, 1061 and 1071, and compare it with the reference voltage 1045. If the second level voltage v2 is less than the reference voltage 1045, the EA 1046 amplifies its output, and the PWM comparator 1048 extends a duty cycle to boost the first level voltage v1; or if the second level voltage v2 is greater than the reference voltage 1045, the PWM comparator 1048 shortens the duty cycle to reduce the first level voltage v1.

Alternatively, in some embodiments, the plurality of loads 1022, 1052, 1062 and 1072 may be in a high-side connection, and the voltage received at the anode of one of the plurality of LED string 1021, 1051, 1061 and 1071 are used for regulation. Similar to the exemplary embodiment 900b when a single load is used, the embodiment of multi-string LEDs with multiple high-side connected loads may further comprise a differential amplifier (DIF) to receive inputs from both ends of one constant current source and output a second level voltage v2 to the EA for regulation. The regulation scheme of the buck-boost PFC regulator in such embodiment may be the same as in the low-side connection embodiment, and may achieve the same benefits as the low-side connection embodiment.

In exemplary embodiment 1000 of a PFC converter in a buck-boost configuration using multi-string LEDs, the plurality of load currents flowing though the loads may be controlled separately, and the plurality of load currents may be independent from one another. Further, the plurality of load currents may be independent from the VPFC regulation loop. Even further, the exemplary embodiment 1000 may achieve the same high PFC level and other similar benefits as the exemplary embodiment 900. In some embodiments, the exemplary embodiment 1000 may require that the VPFC level be high enough to provide the voltage drop across the LED string in addition to the headroom voltage across the constant current source for each of the plurality of loads.

Figure 11:
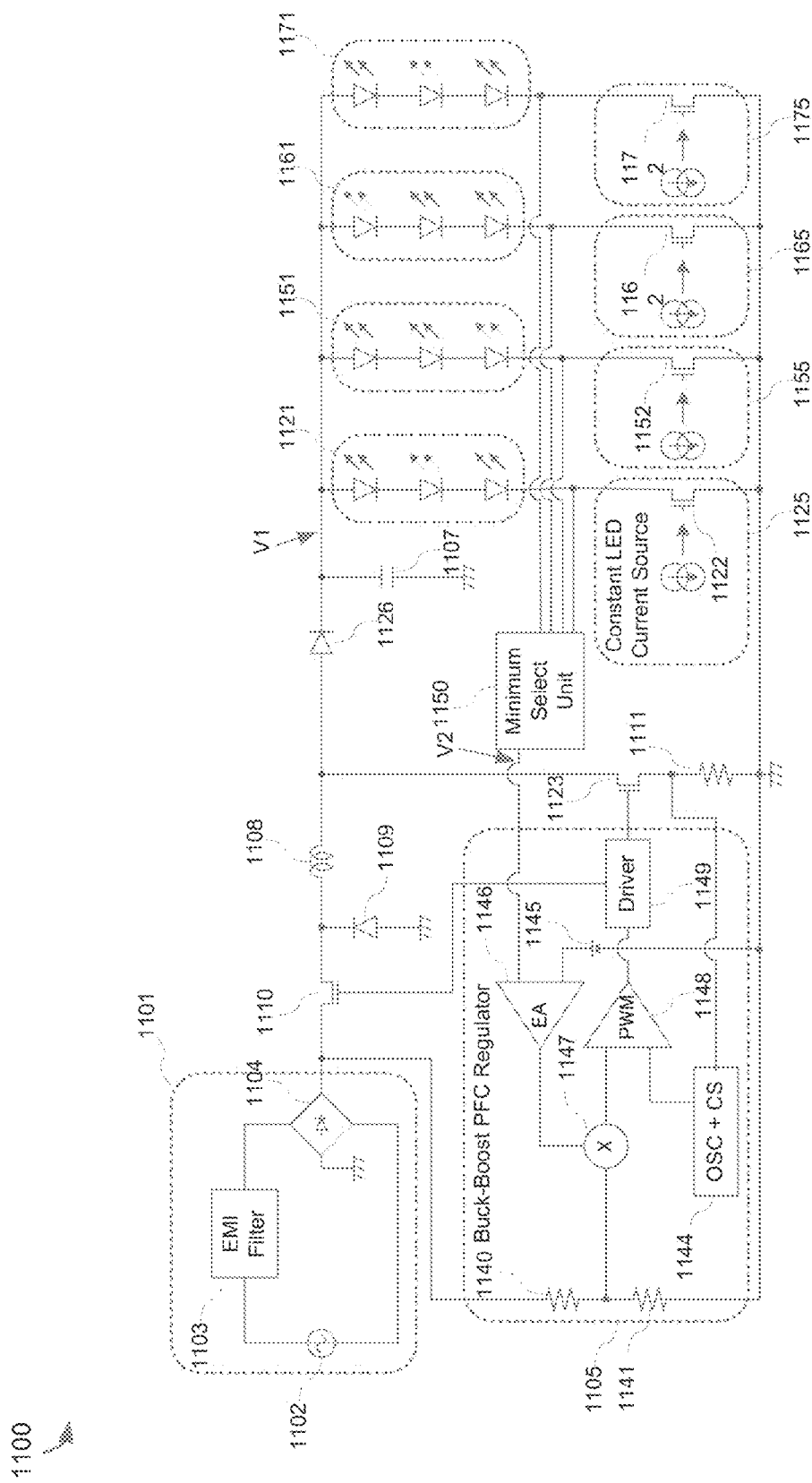
FIG. 11 illustrates an exemplary embodiment of a buck-boost configuration feeding multiple low side connected loads, each load consisting of an LED-string and a constant current source; a minimum select unit sends feedback to the converter in accordance with the present invention.

In yet another embodiment, the PFC converter in a buck-boost configuration with a plurality of loads may further comprise a minimum select unit. FIG. 11 illustrates an exemplary embodiment 1100 of a buck-boost configuration using multi-string LEDs, a minimum select unit and multiple low-side connected loads in accordance with the present invention. The exemplary embodiment 1100 may have the same configuration as FIG. 10 except that a minimum select unit may be connected to the cathodes of the plurality of LED strings. In exemplary embodiment 1100, the plurality of loads are in low-side connection, a minimum select unit 1150 may select a minimum value from a plurality of voltages received at the cathodes of the plurality of the LED strings 1121, 1151, 1161 and 1171, and transmit the minimum value to the buck-boost PFC regulator 1105 as a second level voltage v2. Alternatively, in some embodiment when the plurality of loads are in high-side connection, the minimum select unit 1150 may select a minimum value from a plurality of voltages received at the anodes of the plurality of the LED strings 1121, 1151, 1161 and 1171, and transmit the minim value via a differential amplifier (DIF) to the buck-boost PFC regulator for regulation. The operation of the DIF may be the same as in exemplary embodiment 900b, and may achieve similar benefits as in the low-side connection embodiment.

The exemplary embodiment 1100 improves the performance of the exemplary embodiment 1000. The voltages across the plurality of the LED strings and constant current sources are compared against one another, and a smallest headroom voltage is detected. The smallest headroom voltage is fed back to the buck-boost PFC regulator for regulation. The exemplary embodiment 1100 improves the system efficiency by maintaining the outputted VPFC level at a minimum level necessary for proper system operation, thus minimizes the headroom loss inherently applied to all the loads attached to the minimum select unit.

Figure 12:
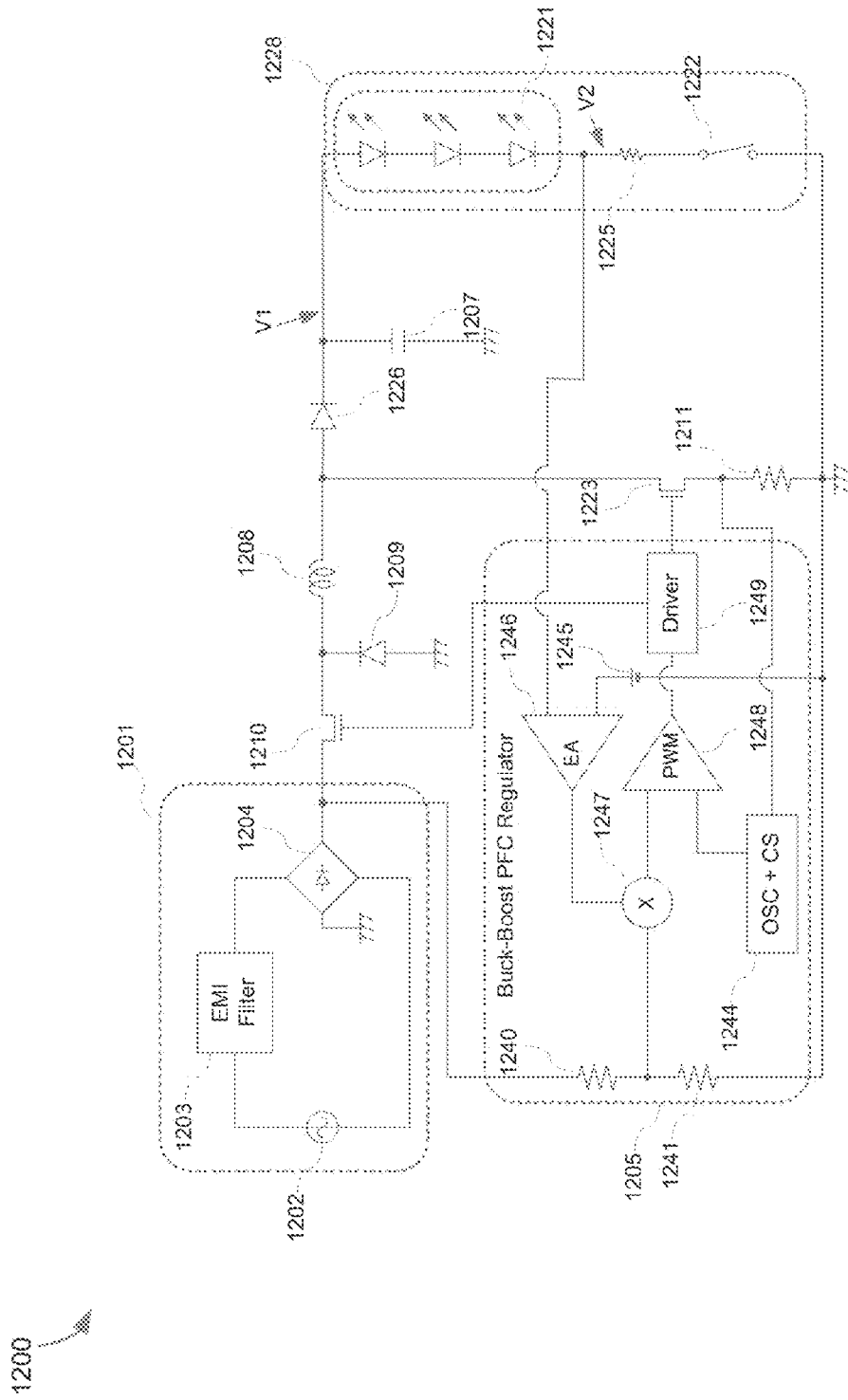
FIG. 12 illustrates an exemplary embodiment of a buck-boost configuration buck-boost configuration using a current sense resistor and a low-side connected load in accordance with the present invention.

In yet another embodiment, the constant current source of the PFC converter in a buck-boost configuration may be replaced with a current sense resistor and an optional disconnect switch. FIG. 12 illustrates an exemplary embodiment 1200 of a buck-boost configuration buck-boost configuration using a current sense resistor and a low-end connected load in accordance with the present invention. The exemplary embodiment 1200 may have the same configuration as the exemplary embodiment 900 except that the constant current source is replaced with a current sense resistor 1225 and an optional disconnect switch 1222. In the exemplary embodiment 1200, the load 1228 may comprise a light-emitting diode (LED) string 1221 comprising a plurality of diodes connected in series, a current sense resistor 1225 and an optional disconnect switch 1222 with one end connected to one end of the sense resistor.

In the exemplary embodiment 1200, the load is configured to be a low-side connection. The anode of the LED string 1221 is connected to the second diode 1226, the cathode of the LED string 1221 is connected to the other end of the current sense resistor 1225, and the other end of the optional disconnect switch 1222 is connected to ground. The EA 1246 may receive a second level voltage v2 at the cathode of the LED string 1221 and compare it with a reference voltage 1245 that corresponds to an intended voltage drop across the current sense resistor. If the second level voltage v2 is less than the reference voltage 1245, the EA 1246 amplifies its output via the multiplier 1247, and the PWM comparator 1248 extends the duty cycle to boost the first level voltage v1, or if the second level voltage v2 is greater than the reference voltage 1245, the PWM comparator 1248 shortens the duty cycle to reduce the first level voltage v1. The regulation of the first voltage level v1 is achieved when the load current times the current sense resistor equals to the reference voltage 1245.

Figure 12A:
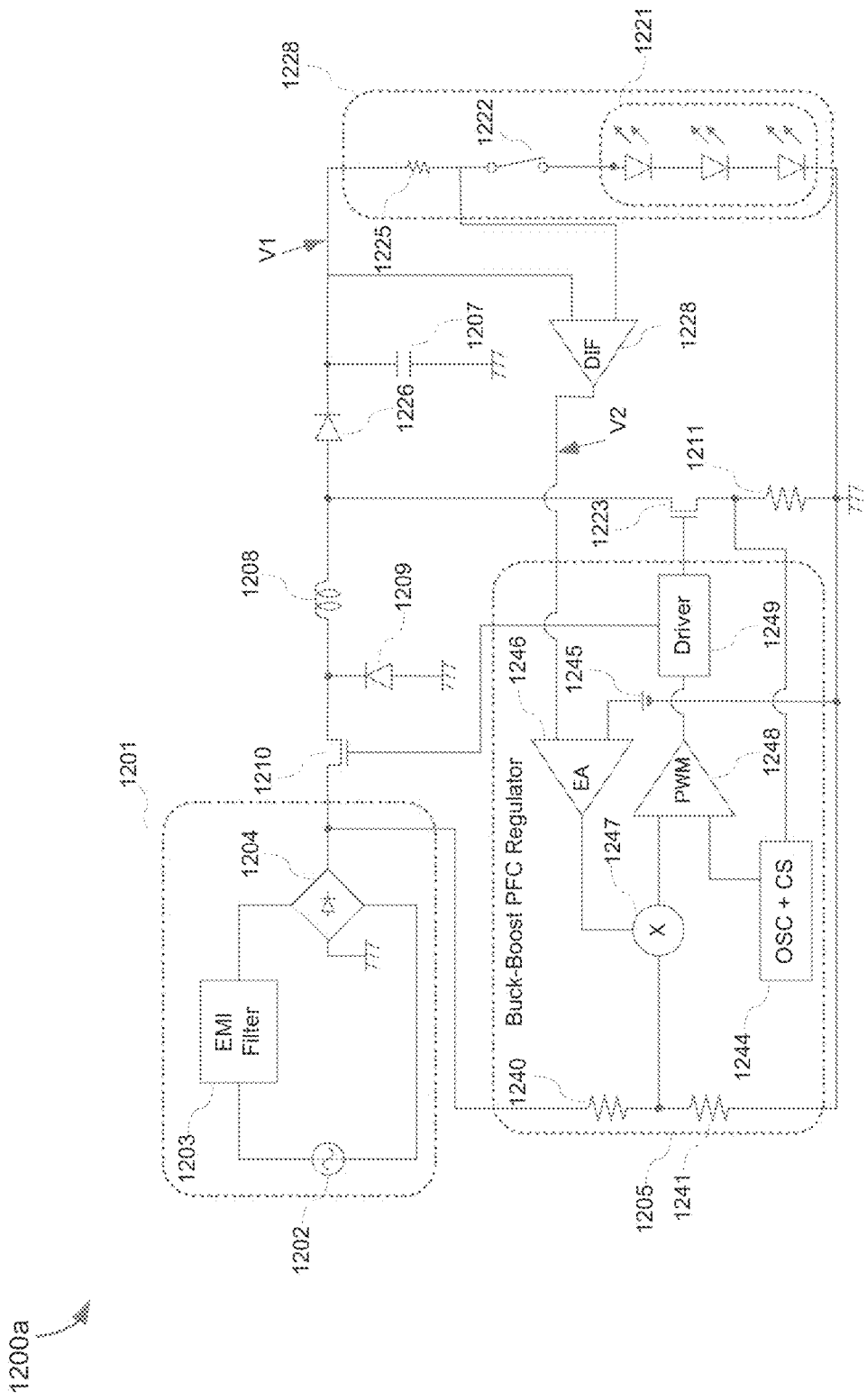
FIG. 12a illustrates an exemplary embodiment of a buck-boost configuration buck-boost configuration using a current sense resistor and a high-side connected load in accordance with the present invention.

In yet another embodiment, the load may be in high-side connection. FIG. 12a illustrates an exemplary embodiment 1200a of a buck-boost configuration buck-boost configuration using a current sense resistor with the load and a high-side connected load in accordance with the present invention. In exemplary embodiment 1200a, the other end of the current sense resistor 1225 is connected to the second diode 1226, the other end of the optional disconnect switch 1222 is connected to the anode of the LED string 1221, and the cathode of the LED string 1221 is connected to ground. The exemplary embodiment 1200a may further comprise a differential amplifier (DIF) 1228. The DIF 1228 may receive inputs from both ends of the current sense resistor 1225, take the difference between the inputs, refer the difference to ground, and output a second level voltage v2 to the EA 1246 for regulation. The regulation scheme of the high-side connection embodiment may be the same as the low-side connection embodiment, and may achieve the same benefits as the low-side connection embodiment.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A power factor correction (PFC) converter in a boost configuration followed by a buck regulator, comprising:
   a set-up circuit configured to supply an input voltage, the set-up circuit comprises:
      an alternating current (AC) source;
      an electromagnetic interference (EMI) filter; and
      a diode bridge;
   a first coil connected to the set-up circuit, and configured to receive a rectified current from the diode bridge;
   a first transistor connected to the first coil;
   a boost PFC regulator configured to regulate a first time pattern of an on/off status of the first transistor;
   a first diode connected to the first transistor, and configured to output a first level voltage;
   a first capacitor connected to the first diode;
   a buck converter configured to receive the first level voltage from the first diode, and convert the first level voltage to a second level voltage, the buck converter comprises:
      a second transistor connected to the first diode;
      a buck regulator connected to the second transistor;
      a second diode connected to the second transistor;
      a second coil connected to the second transistor, and configured to output the second level voltage;
      a second capacitor connected to the second coil; and
   a load connected to the second coil.

2. The power factor correction (PFC) converter in a boost configuration followed by a buck regulator claim 1, wherein the boost PFC regulator further comprises:
   a first pair of resistor dividers connected to the output of the set-up circuit;
   a second pair of resistor dividers configured to receive the first level voltage at the output of a first diode;
   a first reference voltage corresponding to the first level voltage at the output of a first diode;
   a first error amplifier (EA) configured to compare the first reference voltage with the first level voltage received at the second pair of resistor dividers;
   a multiplier configured to receive outputs of the first pair of resistor dividers and the first EA;
   a first oscillator; and
   a first pulse width modulation (PWM) comparator configured to receive outputs of the multiplier and the first oscillator, and regulate the first time pattern of the on/off status of the first transistor.

3. The power factor correction (PFC) converter in a boost configuration followed by a buck regulator of claim 2, wherein
   if the first level voltage received at the second pair of resistor dividers is less than the first reference voltage, the first EA amplifies its output via the multiplier, and the first PWM comparator extends a first duty cycle to boost the first level voltage; or
   if the first level voltage received at the second pair of resistor dividers is greater than the first reference voltage, the first PWM comparator shortens the first duty cycle to reduce the first level voltage.

4. The power factor correction (PFC) converter in a boost configuration followed by a buck regulator of claim 1, wherein the load further comprises:
   a light-emitting diode (LED) string comprising a plurality of diodes connected in series; and
   a constant current source configured to maintain a constant load current or an arbitrarily modulated load current flowing through the LED string.

5. The power factor correction (PFC) converter in a boost configuration followed by a buck regulator of claim 4, wherein
   the LED string is configured to be a low-side connection when the anode of the LED string is connected to the second coil, the cathode of the LED string is connected to one end of the constant current source, and the other end of the constant current source is connected to ground, and
   the buck regulator further comprises:
      a second reference voltage corresponding to an intended voltage drop across the constant current source;
      a second EA configured to compare the second reference voltage with a third level voltage received at the cathode of the LED string;
      a second oscillator; and
      a second PWM comparator configured to receive outputs of the second EA and the second oscillator, and regulate a second time pattern of the on/off status of the second transistor.

6. The power factor correction (PFC) converter in a boost configuration followed by a buck regulator of claim 4, wherein
   the LED string is configured to be a high-side connection when one end of the constant current source is connected to the second coil, the other end of the constant current source is connected to the anode of the LED string, and the cathode of the LED string is connected to ground, and
   the buck regulator further comprises:
      a second reference voltage corresponding to an intended voltage drop across the constant current source;
      a second EA configured to compare the second reference voltage with a third level voltage transmitted by a differential amplifier (DIF);
      a second oscillator; and
      a second PWM comparator configured to receive outputs of the second EA and the second oscillator, and regulate a second time pattern of the on/off status of the second transistor.

7. The power factor correction (PFC) converter in a boost configuration followed by a buck regulator of claim 5 or 6, wherein
   if the third level voltage is less than the second reference voltage, the second EA amplifies its output, and the second PWM comparator extends a second duty cycle to boost the second level voltage; or
   if the third level voltage is greater than the second reference voltage, the second PWM comparator shortens the second duty cycle to reduce the second level voltage.

8. The power factor correction (PFC) converter in a boost configuration followed by a buck regulator of claim 1, wherein when the first transistor is on, the first coil is configured to accumulate received current, or when the first transistor is off, the first coil is configured to transmit accumulated current and output the first level voltage to the buck converter via the first diode.

9. The power factor correction (PFC) converter in a boost configuration followed by a buck regulator of claim 1, wherein the boost PFC regulator is configured to achieve a high power factor correction level by regulating the first time pattern of the on/off status of the first transistor.

10. The power factor correction (PFC) converter in a boost configuration followed by a buck regulator of claim 4, wherein the second level voltage is regulated in a feedback loop comprising the buck converter, the LED string and the constant current source.

11. The power factor correction (PFC) converter in a boost configuration followed by a buck regulator of claim 1, wherein the second level voltage is independent of the first level voltage.

12. The power factor correction (PFC) converter in a boost configuration followed by a buck regulator of claim 1, wherein the constant load current or the arbitrarily modulated load current flowing through the LED string is independent of the current flowing through the set-up circuit, the first level voltage and the second level voltage.

13. The power factor correction (PFC) converter in a boost configuration followed by a buck regulator of claim 1, wherein the load further comprises:
   a light-emitting diode (LED) string comprising a plurality of diodes connected in series;
   a current sense resistor; and
   an optional disconnect switch with one end connected to one end of the current sense resistor.

14. The power factor correction (PFC) converter in a boost configuration followed by a buck regulator of claim 13, wherein
   the LED string is configured to be a low-side connection when the anode of the LED string is connected to the second coil, the cathode of the LED string is connected to the other end of the current sense resistor, and the other end of the optional disconnect switch is connected to ground, and
   the buck regulator further comprises:
      a second reference voltage corresponding to an intended voltage drop across the current sense resistor;
      a second EA configured to compare the second reference voltage with a third level voltage received at the cathode of the LED string;
      a second oscillator; and
      a second PWM comparator configured to receive outputs of the second EA and the second oscillator, and regulate a second time pattern of the on/off status of the second transistor.

15. The power factor correction (PFC) converter in a boost configuration followed by a buck regulator of claim 13, wherein
   the LED string is configured to be a high-side connection when the other end of the current sense resistor is connected to the second coil, the other end of the optional disconnect switch is connected to the anode of the LED string, and the cathode of the LED string is connected to ground, and
   the buck regulator further comprises:
      a second reference voltage corresponding to an intended voltage drop across the current sense resistor;
      a second EA configured to compare the second reference voltage with a third level voltage transmitted by a differential amplifier (DIF);
      a second oscillator; and
      a second PWM comparator configured to receive outputs of the second EA and the second oscillator, and regulate a second time pattern of the on/off status of the second transistor.

16. The power factor correction (PFC) converter in a boost configuration followed by a buck regulator of claim 14 or 15, wherein
   if the third level voltage is less than the second reference voltage, the second EA amplifies its output, and the second PWM comparator extends a second duty cycle to boost the second level voltage; or
   if the third level voltage is greater than the second reference voltage, the second PWM comparator shortens the second duty cycle to reduce the second level voltage.

17. A power factor correction (PFC) converter in a boost configuration followed by a buck regulator comprising:
   a set-up circuit configured to supply an input voltage, the set-up circuit comprises:
      an alternating current (AC) source;
      an electromagnetic interference (EMI) filter; and
      a diode bridge;
   a first coil connected to the set-up circuit, and configured to receive a current from the diode bridge;
   a first transistor connected to the first coil;
   a boost PFC regulator configured to regulate a first time pattern of the on/off status of the first transistor;
   a first synchronous rectifier connected to the first transistor via a first inverter and configured to output a first level voltage;
   a first capacitor connected to the first synchronous rectifier;
   a buck converter configured to receive the first level voltage from the first synchronous rectifier, and convert the first level voltage to a second level voltage, the buck converter further comprises:
      a second transistor connected to the first diode;
      a buck regulator connected to the second transistor;
      a second synchronous rectifier connected to the second transistor via a second inverter;
      a second coil connected to the second transistor, and configured to output the second level voltage; and
      a second capacitor connected to the second coil; and
   a load connected to the second coil.

18. The power factor correction (PFC) converter in a boost configuration followed by a buck regulator of claim 17, wherein the boost PFC regulator further comprises:
   a first pair of resistor dividers connected to the output of the set-up circuit;
   a second pair of resistor dividers configured to receive the first level voltage at the output of the first synchronous rectifier;
   a first reference voltage corresponding to the first level voltage at the output of the first synchronous rectifier;
   a first error amplifier (EA) configured to compare the first reference voltage with the first level voltage received at the second pair of resistor dividers;
   a multiplier configured to receive outputs of the first pair of resistor dividers and the first EA;
   a first oscillator; and
   a first pulse width modulation (PWM) comparator configured to receive outputs of the multiplier and the first oscillator, and regulate the first time pattern of the on/off status of the first transistor in order to force the AC current to follow the AC voltage so as to achieve high PFC level.

19. The power factor correction (PFC) converter in a boost configuration followed by a buck regulator of claim 18, wherein
if the first level voltage is less than the first reference voltage, the first EA amplifies its output via the multiplier, and the first PWM comparator extends a first duty cycle to boost the first level voltage; or
if the first level voltage is greater than the first reference voltage, the first PWM comparator shortens the first duty cycle to reduce the first level voltage.

20. The power factor correction (PFC) converter in a boost configuration followed by a buck regulator of claim 17, wherein the load further comprises:
a light-emitting diode (LED) string comprising a plurality of diodes connected in series; and
a constant current source configured to maintain a constant load current or an arbitrarily modulated load current flowing through the LED string.

21. The power factor correction (PFC) converter in a boost configuration followed by a buck regulator of claim 20, wherein
the LED string is configured to be a low-side connection when the anode of the LED string is connected to the second coil, the cathode of the LED string is connected to one end of the constant current source, and the other end of the constant current source is connected to ground; and
the buck regulator further comprises:
a second reference voltage corresponding to an intended voltage drop across the constant current source;
a second EA configured to compare the second reference voltage with a third level voltage received at the cathode of the LED string;
a second oscillator; and
a second PWM comparator configured to receive outputs of the second EA and the second oscillator, and regulate a second time pattern of the on/off status of the second transistor.

22. The power factor correction (PFC) converter in a boost configuration followed by a buck regulator of claim 20, wherein
the LED string is configured to be a high-side connection when one end of the constant current source is connected to the second coil, the other end of the constant current source is connected to the anode of the LED string, and the cathode of the LED string is connected to ground; and
the buck regulator further comprises:
a second reference voltage corresponding to an intended voltage drop across the constant current source;
a second EA configured to compare the second reference voltage with a third level voltage transmitted by a differential amplifier (DIF);
a second oscillator; and
a second PWM comparator configured to receive outputs of the second EA and the second oscillator, and regulate a second time pattern of the on/off status of the second transistor.

23. The power factor correction (PFC) converter in a boost configuration followed by a buck regulator of claim 21 or 22, wherein
if the third level voltage is less than the second reference voltage, the second EA amplifies its output, and the second PWM comparator extends a second duty cycle to boost the second level voltage; or
if the third level voltage is greater than the second reference voltage, the second PWM comparator shortens the second duty cycle to reduce the second level voltage.

24. The power factor correction (PFC) converter in a boost configuration followed by a buck regulator of claim 1, further comprises a plurality of loads connected to the second coil, wherein
the plurality of loads are connected in parallel, and
each of the plurality of loads further comprises:
a light-emitting diode (LED) string comprising a plurality of diodes connected in series; and
a constant current source configured to maintain a constant load current or an arbitrarily modulated load current flowing through the LED string.

25. The power factor correction (PFC) converter in a boost configuration followed by a buck regulator of claim 24, wherein
the LED string is configured to be a low-side connection when the anode of the LED string is connected to the second coil, the cathode of the LED string is connected to one end of the constant current source, and the other end of the constant current source is connected to ground, and
the buck regulator further comprises:
a second reference voltage corresponding to a lowest intended voltage drop across the plurality of constant current sources;
a second EA configured to compare the second reference voltage with a third level voltage received at the cathode of one of the plurality of the LED strings;
a second oscillator; and
a second PWM comparator configured to receive outputs of the second EA and the second oscillator, and regulate a second time pattern of the on/off status of the second transistor.

26. The power factor correction (PFC) converter in a boost configuration followed by a buck regulator of claim 24, wherein
the LED string is configured to be a high-side connection when one end of the constant current source is connected to the second coil, the other end of the constant current source is connected to the anode of the LED string, and the cathode of the LED string is connected to ground, and
the buck regulator further comprises:
a second reference voltage corresponding to a lowest intended voltage drop across the plurality of constant current sources;
a second EA configured to compare the second reference voltage with a third level voltage transmitted by a differential amplifier (DIF);
a second oscillator; and
a second PWM comparator configured to receive outputs of the second EA and the second oscillator, and regulate a second time pattern of the on/off status of the second transistor.

27. The power factor correction (PFC) converter in a boost configuration followed by a buck regulator of claim 25 or 26, wherein
if the third level voltage is less than the second reference voltage, the second EA amplifies its output, and the second PWM comparator extends a second duty cycle to boost the second level voltage; or if the third level voltage is greater than the second reference voltage, the second PWM comparator shortens the second duty cycle to reduce the second level voltage.

28. A power factor correction (PFC) converter in a buck-boost configuration, comprising:
a set-up circuit configured to supply an input voltage, the set-up circuit comprises:
an alternating current (AC) source;
an electromagnetic interference (EMI) filter that; and
a diode bridge;
a buck transistor connected to the set-up circuit, and configured to receive a current from the diode bridge;
a first diode connected to the buck transistor;
a boost transistor;
a resistor connected to the boost transistor;
a coil that connects the buck transistor and the boost transistor;
a buck-boost PFC regulator connected to the set-up circuit, and configured to regulate a time pattern of the on/off status of the buck transistor and the boost transistor synchronously;
a second diode connected to the coil and the boost transistor, and configured to output a first level voltage;
a capacitor connected to the second diode; and
a load connected to the second diode.

29. The power factor correction (PFC) converter in a buck-boost configuration of claim 28, wherein the load further comprises:
a light-emitting diode (LED) string comprising a plurality of diodes connected in series; and
a constant current source configured to maintain a constant load current or an arbitrarily modulated load current flowing through the LED string.

30. The power factor correction (PFC) converter in a buck-boost configuration of claim 29, wherein
the LED string is configured to be a low-side connection when the anode of the LED string is connected to the second diode, the cathode of the LED string is connected to one end of the constant current source, and the other end of the constant current source is connected to ground, and
the buck-boost PFC regulator further comprises:
a pair of resistor dividers connected to the output of the set-up circuit;
a reference voltage corresponding to an intended voltage drop across the constant current source;
an error amplifier (EA) configured to compare the reference voltage with a second level voltage received at the cathode of the LED string;
a multiplier configured to receive outputs of the pair of resistor dividers and the EA;
an oscillator and current sense ramp generator configured to receive the output of the boost transistor;
a pulse width modulation (PWM) comparator configured to receive outputs of the multiplier and the oscillator and current sense ramp generator, and
a driver that connects the output of the PWM comparator with the buck transistor and the boost transistor to synchronously regulate the time pattern of the on/off status of the buck transistor and the boost transistor.

31. The power factor correction (PFC) converter in a buck-boost configuration of claim 29, wherein
the LED string is configured to be a high-side connection when one end of the constant current source is connected to the second diode, the other end of the constant current source is connected to the anode of the LED string, and the cathode of the LED string is connected to ground, and
the buck-boost PFC regulator further comprises:
a pair of resistor dividers connected to the output of the set-up circuit;
a reference voltage corresponding to an intended voltage drop across the constant current source;
an error amplifier (EA) configured to compare the reference voltage with a second level voltage transmitted by a differential amplifier (DIF);
a multiplier configured to receive outputs of the pair of resistor dividers and the EA;
an oscillator and current sense ramp generator configured to receive the output of the boost transistor;
a pulse width modulation (PWM) comparator configured to receive outputs of the multiplier and the oscillator and current sense ramp generator, and
a driver that connects the output of the PWM comparator with the buck transistor and the boost transistor to synchronously regulate the time pattern of the on/off status of the buck transistor and the boost transistor.

32. The power factor correction (PFC) converter in a buck-boost configuration of claim 30 or 31, wherein
if the second level voltage is less than the reference voltage, the EA amplifies its output via the multiplier, and the PWM comparator extends the duty cycle to boost the first level voltage; or
if the second level voltage is greater than the reference voltage, the PWM comparator shortens the duty cycle to reduce the first level voltage.

33. The power factor correction (PFC) converter in a buck-boost configuration of claim 28, wherein
when the buck transistor and the boost transistor are on synchronously, the coil is configured to accumulate received current; and
when the buck transistor and the boost transistor are off synchronously, the coil is configured to transmit accumulated current and output the first level voltage via the second diode.

34. The power factor correction (PFC) converter in a buck-boost configuration of claim 28, wherein the buck-boost PFC regulator is configured to achieve a high power factor correction level by regulating the time pattern of the on/off status of the buck transistor and the boost transistor synchronously.

35. The power factor correction (PFC) converter in a buck-boost configuration of claim 29, wherein the first level voltage is regulated in a feedback loop comprising the second diode, the capacitor, the LED string and the constant current source.

36. The power factor correction (PFC) converter in a buck-boost configuration of claim 29, wherein the constant load current or the arbitrarily modulated load current flowing through the LED string is independent from the current flowing through the set-up circuit and the first level voltage.

37. A power factor correction (PFC) converter in a buck-boost configuration, comprising:
a set-up circuit configured to supply an input voltage, the set-up circuit comprises:
an alternating current (AC) source;
an electromagnetic interference (EMI) filter; and
a diode bridge;
a buck transistor connected to the set-up circuit, and configured to receive a current from the diode bridge;
a boost transistor;
a resistor connected to the boost transistor;
a coil that connects the buck transistor and the boost transistor in series;

a first synchronous rectifier connected to the buck transistor;

a second synchronous rectifier connected to the boost transistor;

a buck-boost PFC regulator connected to the set-up circuit, and configured to regulate a first time pattern of an on/off status of the buck transistor and the boost transistor and a second time pattern of an on/off status of the first synchronous rectifier and the second synchronous rectifier in a synchronous manner;

a capacitor connected to the second synchronous rectifier; and a load connected to the second synchronous rectifier.

38. The power factor correction (PFC) converter in a buck-boost configuration of claim 37, wherein the load further comprises:

a light-emitting diode (LED) string comprising a plurality of diodes connected in series; and a constant current source configured to maintain a constant load current or an arbitrarily modulated load current flowing through the LED string.

39. The power factor correction (PFC) converter in a buck-boost configuration of claim 37, wherein the LED string and the constant current source are configured to be a low-side connection when the anode of the LED string is connected to the second synchronous rectifier, the cathode of the LED string is connected to one end of the constant current source, and the other end of the constant current source is connected to ground, and the buck-boost PFC regulator further comprises:

a pair of resistor dividers connected to the output of the set-up circuit;

a reference voltage corresponding to an intended voltage drop across the constant current source;

an error amplifier (EA) configured to compare the reference voltage with a second level voltage received at the cathode of the LED string;

a multiplier configured to receive outputs of the pair of resistor dividers and the EA;

an oscillator and current sense ramp generator configured to receive the output of the boost transistor; and a pulse width modulation (PWM) comparator configured to receive outputs of the multiplier and the oscillator and current sense ramp generator, and a driver that connects the output of PWM comparator with the buck transistor, the boost transistor, the first synchronous rectifier, and the second synchronous rectifier to regulate synchronously the first time pattern of the on/off status of the buck transistor and the boost transistor, and the second time pattern of the on/off status of the first synchronous rectifier and the second synchronous rectifier.

40. The power factor correction (PFC) converter in a buck-boost configuration of claim 37, wherein the LED string and the constant current source are configured to be a high-side connection when one end of the constant current source is connected to the second synchronous rectifier, the other end of the constant current source is connected to the anode of the LED string, and the cathode of the LED string is connected to ground, and the buck-boost PFC regulator further comprises:

a pair of resistor dividers connected to the output of the set-up circuit;

a reference voltage corresponding to an intended voltage drop across the constant current source;

an error amplifier (EA) configured to compare the reference voltage with a second level voltage transmitted by a differential amplifier (DIF);

a multiplier configured to receive outputs of the pair of resistor dividers and the EA;

an oscillator and current sense ramp generator configured to receive the output of the boost transistor; and a pulse width modulation (PWM) comparator configured to receive outputs of the multiplier and the oscillator and current sense ramp generator, and a driver that connects the output of PWM comparator with the buck transistor, the boost transistor, the first synchronous rectifier, and the second synchronous rectifier to regulate synchronously the first time pattern of the on/off status of the buck transistor and the boost transistor, and the second time pattern of the on/off status of the first synchronous rectifier and the second synchronous rectifier.

41. The power factor correction (PFC) converter in a buck-boost configuration of claim 39 or 40, wherein if the second level voltage is less than the reference voltage, the EA amplifies its output via the multiplier, and the PWM comparator extends the duty cycle to boost the first level voltage; or if the second level voltage is greater than the reference voltage, the PWM comparator shortens the duty cycle to reduce the first level voltage.

42. The power factor correction (PFC) converter in a buck-boost configuration of claim 37, wherein when the buck transistor and the boost transistor are synchronously on, the first synchronous rectifier and the second synchronous rectifier are synchronously off, and the coil is configured to accumulate current, and when the buck transistor and the boost transistor are synchronously turned off, the first synchronous rectifier and the second synchronous rectifier are synchronously turned on, and the coil is configured to transmit the accumulated current and output the first level voltage via the second synchronous rectifier.

43. The power factor correction (PFC) converter in a buck-boost configuration of claim 37, wherein the buck-boost PFC regulator is configured to achieve a high power factor correction level by regulating synchronously the first time pattern of the on/off status of the buck transistor and the boost transistor, and the second time pattern of the on/off status of the first synchronous rectifier and the second synchronous rectifier.

44. The power factor correction (PFC) converter in a buck-boost configuration of claim 38, wherein the first level voltage is regulated in a feedback loop comprising the second synchronous rectifier, the capacitor, the LED string and the constant current source.

45. The power factor correction (PFC) converter in a buck-boost configuration of claim 38, wherein the constant load current or the arbitrarily modulated load current flowing through the LED string is configured to be independent from the current flowing through the set-up circuit and the first level voltage.

46. The power factor correction (PFC) converter in a buck-boost configuration of claim 28, further comprises a plurality of loads connected to the second diode, wherein the plurality of loads are connected in parallel, and each of the plurality of loads further comprises:

a light-emitting diode (LED) string comprising a plurality of diodes connected in series; and a constant current source configured to maintain a constant load current or an arbitrarily modulated load current flowing through the LED string.

47. The power factor correction (PFC) converter in a buck-boost configuration of claim 46, wherein the plurality of constant load currents or the arbitrarily modulated load currents flowing through the plurality of LED strings are configured to be independent from the current flowing through the set-up circuit and the first level voltage, and the plurality of constant load currents or the arbitrarily modulated load currents flowing through the plurality of LED strings are independent from each other.

48. The power factor correction (PFC) converter in a buck-boost configuration of claim 46, wherein
when the buck transistor and the boost transistor are synchronously on, the coil is configured to accumulate received current; and
when the buck transistor and the boost transistor are synchronously off, the coil is configured to transmit the accumulated current and output the first level voltage via the second diode.

49. The power factor correction (PFC) converter in a buck-boost configuration of claim 46, wherein
the LED string is configured to be a low-side connection when the anode of the LED string is connected to the second diode, the cathode of the LED string is connected to one end of the constant current source, and the other end of the constant current source is connected to ground, and
the buck-boost PFC regulator further comprises:
a pair of resistor dividers connected to the output of the set-up circuit;
a reference voltage corresponding to a lowest intended voltage drop across the plurality of constant current sources;
an error amplifier (EA) configured to compare the reference voltage with a second level voltage received at the cathode of one of the plurality of the LED strings;
a multiplier configured to receive outputs of the pair of resistor dividers and the EA;
an oscillator and current sense ramp generator configured to receive the output of the boost transistor;
a pulse width modulation (PWM) comparator configured to receive outputs of the multiplier and the oscillator and current sense ramp generator, and
a driver that connects the output of PWM comparator with the buck transistor and the boost transistor to synchronously regulate the time pattern of the on/off status of the buck transistor and the boost transistor.

50. The power factor correction (PFC) converter in a buck-boost configuration of claim 46, wherein
the LED string is configured to be a high-side connection when one end of the constant current source is connected to the second diode, the other end of the constant current source is connected to the anode of the LED string, and the cathode of the LED string is connected to ground, and
the buck-boost PFC regulator further comprises:
a pair of resistor dividers connected to the output of the set-up circuit;
a reference voltage corresponding to a lowest intended voltage drop across the plurality of constant current sources;
an error amplifier (EA) configured to compare the reference voltage with a second level voltage transmitted by a differential amplifier (DIF);
a multiplier configured to receive outputs of the pair of resistor dividers and the EA;
an oscillator and current sense ramp generator configured to receive the output of the boost transistor;
a pulse width modulation (PWM) comparator configured to receive outputs of the multiplier and the oscillator and current sense ramp generator, and
a driver that connects the output of PWM comparator with the buck transistor and the boost transistor to synchronously regulate the time pattern of the on/off status of the buck transistor and the boost transistor.

51. The power factor correction (PFC) converter in a boost-buck configuration of claim 49 or 50, wherein
if the second level voltage is less than the reference voltage, the EA amplifies its output via the multiplier, and the PWM comparator extends the duty cycle to boost the first level voltage; or
if the second level voltage is greater than the reference voltage, the PWM comparator shortens the duty cycle to reduce the first level voltage.

52. The power factor correction converter in a buck-boost configuration of claim 49, further comprises a minimum select unit configured to select a minimum value from a plurality of voltages received at the cathodes of the plurality of the LED strings, and transmit the minimum value to the buck-boost PFC regulator as the second level voltage.

53. The power factor correction converter in a buck-boost configuration of claim 50, further comprises a minimum select unit configured to select a minimum value from a plurality of voltages received at the anodes of the plurality of the LED strings, and transmit the minimum value to the buck-boost PFC regulator via the DIF as the second level voltage.

54. The power factor correction (PFC) converter in a buck-boost configuration of claim 28, wherein the load further comprises:
a light-emitting diode (LED) string comprising a plurality of diodes connected in series;
a current sense resistor; and
an optional disconnect switch with one end connected to one end of the current sense resistor.

55. The power factor correction (PFC) converter in a buck-boost configuration of claim 54, wherein
the LED string is configured to be a low-side connection when the anode of the LED string is connected to the second diode, the cathode of the LED string is connected to the other end of the current sense resistor, and the other end of the optional disconnect switch is connected to ground; and
the buck-boost PFC regulator further comprises:
a pair of resistor dividers connected to the output of the set-up circuit;
a reference voltage corresponding to an intended voltage drop across the current sense resistor;
an error amplifier (EA) configured to compare the reference voltage with a second level voltage received at the cathode of the LED string;
a multiplier configured to receive outputs of the pair of resistor dividers and the EA;
an oscillator and current sense ramp generator configured to receive the output of the boost transistor;
a pulse width modulation (PWM) comparator configured to receive outputs of the multiplier and the oscillator and current sense ramp generator, and
a driver that connects the output of the PWM comparator with the buck transistor and the boost transistor to synchronously regulate the time pattern of the on/off status of the buck transistor and the boost transistor.

56. The power factor correction (PFC) converter in a buck-boost configuration of claim 54, wherein the LED string is configured to be a high-side connection when the other end of the current sense resistor is connected to the second diode, the other end of the optional disconnect switch is connected to the anode of the LED string, and the cathode of the LED string is connected to ground; and the buck-boost PFC regulator further comprises:
- a pair of resistor dividers connected to the output of the set-up circuit;
- a reference voltage corresponding to an intended voltage drop across the current sense resistor;
- a differential amplifier (DIF) configured to receive inputs from the first level voltage and the anode of the LED string, and output a second level voltage;
- an error amplifier (EA) configured to compare the reference voltage with the second level voltage;
- a multiplier configured to receive outputs of the pair of resistor dividers and the EA;
- an oscillator and current sense ramp generator configured to receive the output of the boost transistor;
- a pulse width modulation (PWM) comparator configured to receive outputs of the multiplier and the oscillator and current sense ramp generator, and
- a driver that connects the output of the PWM comparator with the buck transistor and the boost transistor to synchronously regulate the time pattern of the on/off status of the buck transistor and the boost transistor.

57. The power factor correction (PFC) converter in a buck-boost configuration of claim 55 or 56, wherein
- if the second level voltage is less than the reference voltage, the EA amplifies its output via the multiplier, and the PWM comparator extends the duty cycle to boost the first level voltage; or
- if the second level voltage is greater than the reference voltage, the PWM comparator shortens the duty cycle to reduce the first level voltage.

* * * * *